(12) United States Patent
Shimahashi

(10) Patent No.: US 8,792,137 B2
(45) Date of Patent: Jul. 29, 2014

(54) CONTROL APPARATUS FOR CONTROLLING PROCESS FOR PRINTING

(71) Applicant: Takuya Shimahashi, Nagoya (JP)

(72) Inventor: Takuya Shimahashi, Nagoya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 13/768,496

(22) Filed: Feb. 15, 2013

(65) Prior Publication Data

US 2013/0242315 A1    Sep. 19, 2013

(30) Foreign Application Priority Data

Mar. 16, 2012 (JP) ................................. 2012-061229

(51) Int. Cl.
*G06K 15/00* (2006.01)
*G03G 15/043* (2006.01)

(52) U.S. Cl.
USPC ........................................ 358/3.07; 358/1.1

(58) Field of Classification Search
USPC ............. 358/3.07, 1.1; 378/34; 359/237, 618, 359/663; 355/67; 362/268; 250/492.2
See application file for complete search history.

(56) References Cited

U.S. PATENT DOCUMENTS

| 5,790,272 A | 8/1998 | Goto et al. |
| 6,876,494 B2* | 4/2005 | Ishikawa et al. ............... 359/618 |
| 6,987,830 B2* | 1/2006 | Kasumi ........................... 378/34 |
| 7,123,417 B2* | 10/2006 | Ishikawa et al. ............... 359/618 |
| RE40,170 E | 3/2008 | Goto et al. |

FOREIGN PATENT DOCUMENTS

JP    7-115538 A    5/1995

* cited by examiner

*Primary Examiner* — Charlotte M Baker
(74) *Attorney, Agent, or Firm* — Scully, Scott, Murphy & Presser, PC

(57) ABSTRACT

In a control apparatus, first type binary image data representing density of pixels arranged along a first image direction at a first resolution is acquired, and a first determining process is executed to determine an exposure pattern used to execute exposures of exposure lines at a second resolution lower than the first resolution along a first exposure direction. In the first determining process, a partial exposure pattern for exposing an output partial area that is correlated with a binary partial area and that overlaps N successive exposure lines is determined such that distribution of exposure amounts in the output partial area along the first exposure direction differs according to layout of second-value pixels in the binary partial area at least in the first image direction, thereby enabling an image of color material to be formed through development at a resolution higher than the second resolution in the first exposure direction.

12 Claims, 10 Drawing Sheets

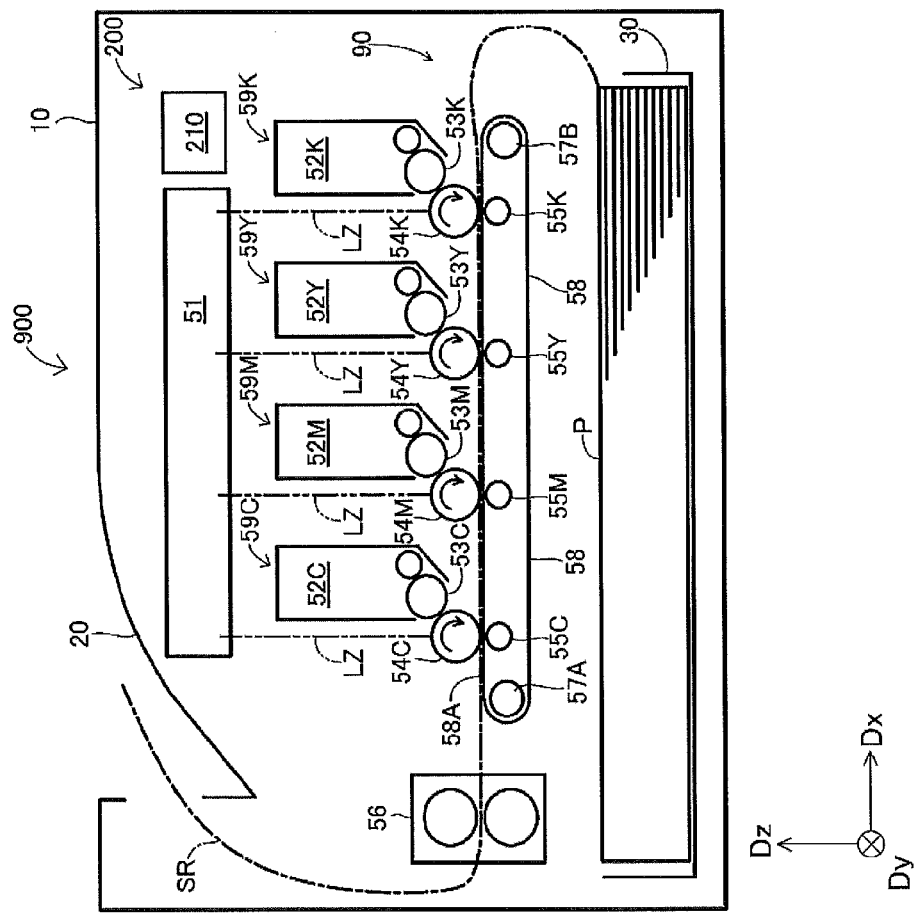
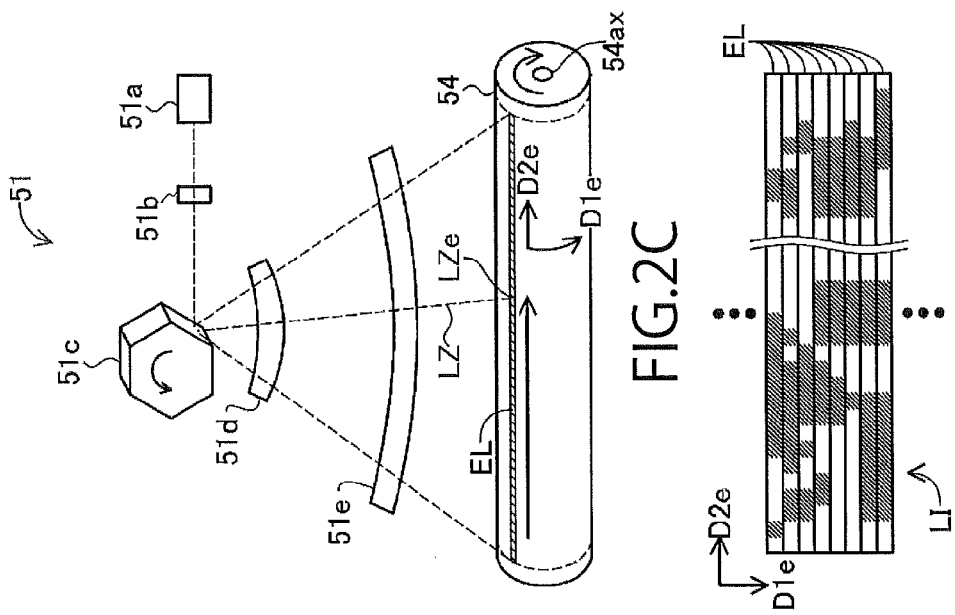

CONTROL APPARATUS FOR CONTROLLING PROCESS FOR PRINTING

CROSS REFERENCE TO RELATED APPLICATION

This application claims priority from Japanese Patent Application No. 2012-061229 filed Mar. 16, 2012. The entire content of this priority application is incorporated herein by reference.

TECHNICAL FIELD

The present invention relates to a technology for exposing a surface of a photosensitive body to light, in order to perform a printing.

BACKGROUND

There is popularized such a printer that forms an electrostatic latent image by exposing a surface of a photosensitive drum in condition that, on the photosensitive drum, a plurality of positions (elements) are arranged along a line extending in the main scanning direction so as to be irradiated with an optical beam, develops the electrostatic latent image by using color material such as toner, and transfers onto a printing medium the color material image formed through the development. In relation to such a printer, one method has been proposed to improve the linearity of the output density, by arranging, on the photosensitive drum, the plurality of positions (elements) to be irradiated with an optical beam along a plurality of lines, each of which extends in the main scanning direction and which are arranged adjacent to one another in a subsidiary scanning direction.

SUMMARY

Image quality is evaluated not only based on the tone characteristics but also based on various points of view. For example, the image quality can be improved by enhancing the resolution of a printed image. In order to enhance the resolution of the printed image, it is required to control the color material image at an enhanced resolution. For example, it is required to enhance the resolution of an exposure pattern representing exposure positions to be exposed on the surface of the photosensitive body. However, there is a case where various disadvantages occur due to enhancement of the resolution of the exposure pattern. For example, there is a case where the length of time required for the exposure process increases. Such a disadvantage can be suppressed by decreasing the exposure pattern resolution. Decreasing the exposure pattern resolution, however, decreases the resolution of the resultant color material image.

In view of the foregoing, it is an object of the invention to provide a technology enabling a color material image to be formed at a resolution higher than the resolution of the exposure pattern.

In order to attain the above and other objects, the invention provides a control apparatus for controlling a process for printing an image, the control apparatus including: a processor; and a memory that stores a computer program that, when executed by the processor, causes the control apparatus to function as: an acquisition unit; and a determining unit. The acquisition unit is configured to acquire first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value. The determining unit is configured to execute a first determining process to determine an exposure pattern by using the first type binary image data, the exposure pattern representing exposure positions to be exposed to light on a surface of a photosensitive body. The exposure pattern indicates the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines. The first determining process determines the exposure pattern such that the exposure pattern is used to execute exposures of the plurality of exposure lines at a second resolution along the first exposure direction, the second resolution being lower than the first resolution. In the first determining process, the determining unit determines a partial exposure pattern for exposing an output partial area, the determining unit determining the partial exposure pattern for the output partial area by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area. The output partial area overlaps N successive exposure lines that are arranged adjacent to one another in the first exposure direction, where N is an integer greater than or equal to two (2), the output partial area overlapping part of each of the N exposure lines. The determining unit determines the partial exposure pattern such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

According to another aspect, the present invention provides a method for controlling a process for printing an image, the method including: acquiring first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value; and executing a first determining process to determine an exposure pattern by using the first type binary image data, the exposure pattern representing exposure positions to be exposed to light on a surface of a photosensitive body, the exposure pattern indicating the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines, the first determining process determining the exposure pattern such that the exposure pattern is used to execute exposures of the plurality of exposure lines at a second resolution along the first exposure direction, the second resolution being lower than the first resolution, in the first determining process, a partial exposure pattern for exposing an output partial area being determined by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area, the output partial area overlapping N successive exposure lines that are arranged adjacent to one another in the first exposure direction, where N is an integer greater than or equal to two (2), the output partial area overlapping part of each of the N exposure lines, the partial exposure pattern being determined such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

According to still another aspect, the present invention provides a non-transitory computer-readable medium storing a set of program instructions that, when executed by a computer, causes the computer to perform operations including: acquiring first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value; and executing a first determining process to determine an exposure pattern by using the first type binary image data, the exposure pattern representing exposure positions to be exposed to light on a surface of a photosensitive body, the exposure pattern indicating the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines, the first determining process determining the exposure pattern such that the exposure pattern is used to execute exposures of the plurality of exposure lines at a second resolution along the first exposure direction, the second resolution being lower than the first resolution, the executing the first determining process including determining a partial exposure pattern for exposing an output partial area, the partial exposure pattern for exposing the output partial area being determined by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area, the output partial area overlapping N successive exposure lines that are arranged adjacent to one another in the first exposure direction, where N is an integer greater than or equal to two (2), the output partial area overlapping part of each of the N exposure lines, the partial exposure pattern being determined such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

BRIEF DESCRIPTION OF THE DRAWINGS

The particular features and advantages of the invention as well as other objects will become apparent from the following description taken in connection with the accompanying drawings, in which:

FIG. 2A is a cross-sectional view showing the general structure of the printer shown in FIG. 1;

FIG. 2B is an explanatory diagram illustrating the general configuration of an exposure unit shown in FIG. 2A;

FIG. 2C is an explanatory diagram showing a sample latent image formed on a surface of a photosensitive drum shown in FIG. 2B;

FIGS. 12A and 12B are illustrations showing partial exposure patterns and resulting toner distributions when a single binary partial area includes a plurality of high-density binary pixels, wherein FIG. 12A is an example according to the first embodiment, and FIG. 12B is an example according to the second embodiment.

DETAILED DESCRIPTION

A control apparatus according to embodiments of the invention will be described while referring to the accompa-

A. First Embodiment

A1. Structure of a Printer

Figure 1:
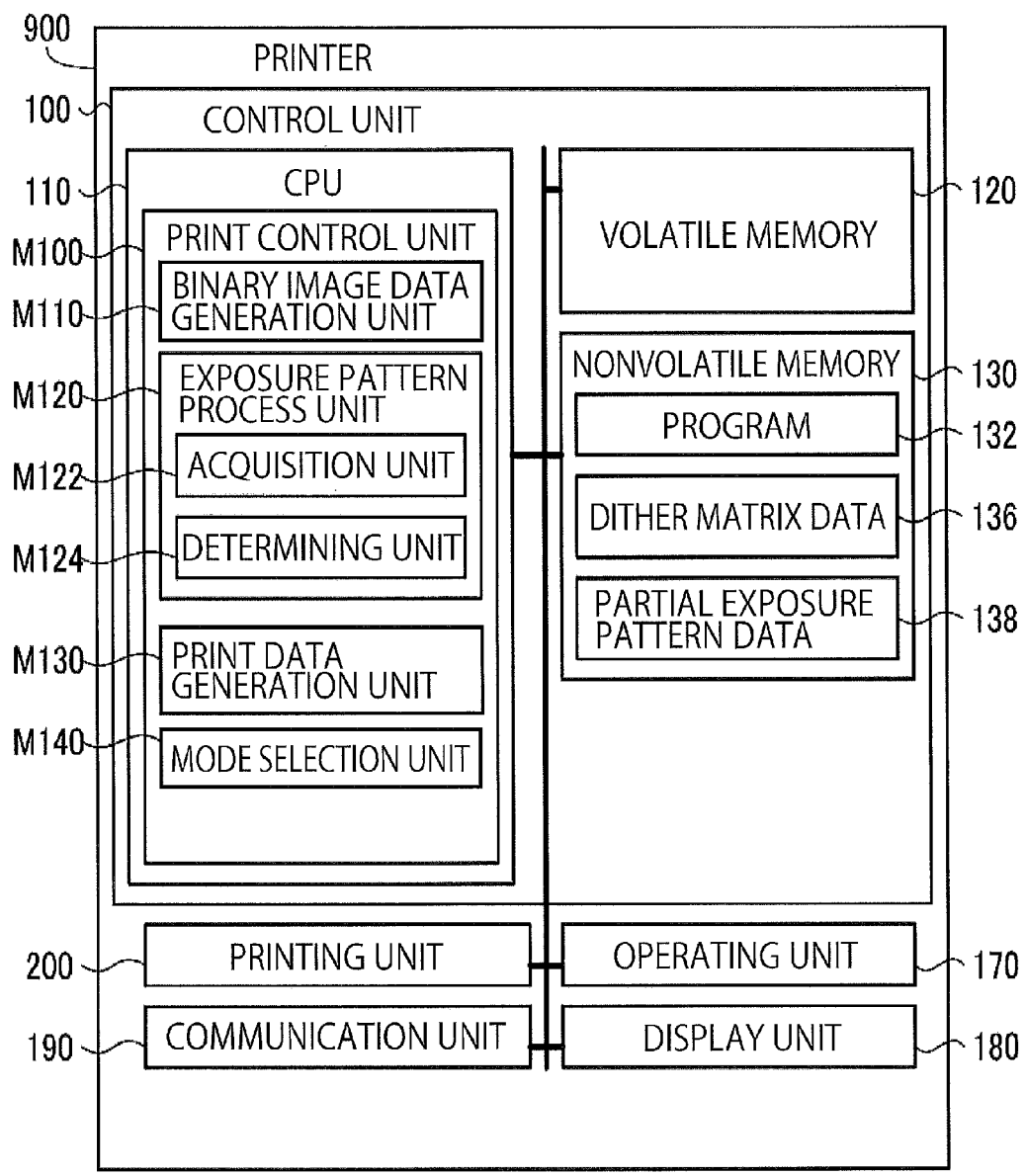
FIG. 1 is a block diagram of a printer according to a first embodiment.

Next, a first embodiment of the present invention will be described while referring to the accompanying drawings. FIG. 1 is a block diagram of a printer 900 according to the first embodiment. The printer 900 includes a control unit 100, an operating unit 170 configured of a touchscreen or the like, a display unit 180 configured of a liquid crystal display or the like, a communication unit 190 serving as an interface for communications with external devices, and a printing unit 200.

In the present embodiment, the printing unit 200 is a color laser printer employing toner in the colors cyan (C), magenta (M), yellow (Y), and black (K). The communication unit 190 has an interface conforming to USB or IEEE 802.3 standards, for example. The control unit 100 is a computer that includes a CPU 110; a volatile memory 120, such as DRAM; and a nonvolatile memory 130, such as EEPROM.

The nonvolatile memory 130 stores a program 132, dither matrix data 136, and partial exposure pattern data 138. The CPU 110 executes the program 132 to implement various functions, including the functions of a print control unit M100. The print control unit M100 generates print data using target image data (hereinafter referred to as "input image data") and controls the printing unit 200 to print an image based on the generated print data by supplying the print data to the printing unit 200. The input image data may be data supplied to the printer 900 via the communication unit 190 from an external device, such as a computer (not shown). In the present embodiment, the print control unit M100 also includes a binary image data generation unit M110, an exposure pattern process unit M120, a print data generation unit M130, and a mode selection unit M140. The exposure pattern process unit M120 includes an acquisition unit M122, and a determining unit M124. The processes executed by these functional units will be described later.

FIG. 2A is a cross-sectional view showing the general structure of the printer 900. As shown in the drawing, the printer 900 has an outer casing 10. The outer casing 10 accommodates the printing unit 200, and a paper tray 30. A discharge tray 20 is a sloped surface formed on top of the outer casing 10. The printing unit 200 includes a conveying mechanism 90, an exposure unit 51, process units 59C, 59M, 59Y, and 59K (also referred to as "process units 59"), transfer rollers 55C, 55M, 55Y, and 55K (also referred to as "transfer rollers 55"), a fixing unit 56, and a control circuit 210 for controlling each component of the printing unit 200. The control circuit 210 controls the components of the printing unit 200 based on print data received from the control unit 100 to print an image represented by the print data. The control circuit 210 is a dedicated electronic circuit, such as an application-specific integrated circuit (ASIC).

The conveying mechanism 90 includes a drive roller 57A and a follow roller 57B arranged parallel to each other and spaced apart in a horizontal direction; a conveying belt 58 formed in a loop and mounted around the rollers 57A and 57B; and a motor and various other rollers (not shown). The conveying mechanism 90 conveys sheets of a printing medium P along a conveying path SR (indicated by a chain line in FIG. 2) leading from the paper tray 30 to the discharge tray 20. The conveying belt 58 circulates together with the rotation of the drive roller 57A for conveying sheets of the printing medium P when a sheet is resting on a top surface 58A of the conveying belt 58.

The process units 59 are arranged parallel to each other and are juxtaposed in a horizontal direction. The process units 59 are arranged above the top surface 58A of the conveying belt 58 and in the order cyan process unit 59C, magenta process unit 59M, yellow process unit 59Y, and black process unit 59K from the downstream side to the upstream side with respect to the printing medium conveying direction. The transfer rollers 55 are also arranged parallel to each other and are juxtaposed horizontally. The transfer rollers 55 are positioned beneath respective process units 59 and are arranged in order of the cyan transfer roller 55C, magenta transfer roller 55M, yellow transfer roller 55Y, and black transfer roller 55K from the downstream side toward the upstream side.

In the present embodiment, a symbol identifying the toner color employed by a component is appended to the reference numeral representing the component, including reference numerals representing the process units, components of the process units, and transfer rollers. Specifically, "C" is appended to reference numerals to denote cyan toner, "M" to denote magenta toner, "Y" to denote yellow toner, and "K" to denote black toner. In the following description, a symbol for differentiating toner color may be omitted when there is no need to differentiate among individual components.

Each of the process units 59 includes a toner cartridge 52, a developing roller 53, and a photosensitive drum 54. The developing roller 53 contacts the corresponding photosensitive drum 54 to develop an electrostatic latent image formed on the surface of the photosensitive drum 54 with toner into a toner image. Each photosensitive drum 54 contacts the conveying belt 58 for transferring the toner image formed on the surface through development to a sheet of printing medium P. The transfer rollers 55 are disposed on the opposite side (bottom) of the conveying belt 58 from the corresponding photosensitive drums 54 so that the conveying belt 58 is interposed between pairs of corresponding photosensitive drums 54 and transfer rollers 55.

The exposure unit 51 is disposed above the process units 59. FIG. 2B is an explanatory diagram illustrating the general configuration of the exposure unit 51. In FIG. 2B, the structure for one type of toner is shown, but the exposure unit 51 includes the same configuration shown in FIG. 2B for each toner color. As shown in FIG. 2B, the exposure unit 51 includes a laser light source 51a, such as a laser diode; a first lens 51b, such as a cylindrical lens, for transmitting a laser beam emitted from the laser light source 51a; a polygon mirror 51c for controlling the exposure position (irradiated position) on the surface of the photosensitive drum 54 by controlling the reflection angle of the laser beam transmitted through the first lens 51b; and a first scanning lens 51d, such as an fθ lens, and a second scanning lens 51e, such as a toric lens, for transmitting a laser beam LZ reflected off the polygon mirror 51c. The polygon mirror 51c is driven to rotate by a motor (not shown).

The control circuit 210 performs a main scan by rotating the polygon mirror 51c in order to move an exposure position (irradiated position) LZe of the laser beam LZ in a second exposure direction D2e over the surface of the photosensitive drum 54. The second exposure direction D2e is approximately parallel to a rotational axis 54ax of the photosensitive drum 54. The second exposure direction D2e will be referred to also as a "main scanning direction" hereinafter. A line extending along the second exposure direction D2e over the surface of the photosensitive drum 54 will be called an exposure line EL. In the present embodiment, a single exposure line EL is equivalent to the line depicted by the exposure position (irradiated position) LZe in one main scan.

The control circuit 210 controls the photosensitive drum 54 to rotate about the rotational axis 54ax in synchronization with movement of the conveying belt 58 (FIG. 2A). A first exposure direction D1e shown in FIG. 2B indicates the direction opposite the direction in which the surface of the photosensitive drum 54 moves through this rotation. The polygon mirror 51c performs main scans while the photosensitive drum 54 rotates. Through this process, main scans over the surface of the photosensitive drum 54 in the second exposure direction D2e are repeatedly performed in the first exposure direction D1e. Consequently, a plurality of exposure lines EL is formed on the surface of the photosensitive drum 54 at different positions in the first exposure direction D1e. The first exposure direction D1e will be referred to also as a "subsidiary scanning direction" hereinafter.

In order to produce a desired toner image according to the print data received from the control unit 100, the control circuit 210 controls, during a main scan, the intensity of the laser beam emitted from the laser light source 51a through pulse width modulation (PWM) control, for example. That is, during the main scan, the control circuit 210 controls whether the beam is on or off based on the print data. Through this process, an electrostatic latent image representing the desired toner image is formed on the surface of the photosensitive drum 54.

FIG. 2C is an explanatory diagram showing a sample latent image LI formed on the surface of the photosensitive drum 54. As shown in the drawing, a plurality of exposure lines EL extending along the second exposure direction D2e are formed on the surface of the photosensitive drum 54 at positions juxtaposed in the first exposure direction D1e. Together, these exposure lines EL form a latent image LI. In the present embodiment, the exposure lines EL are juxtaposed in the first exposure direction D1e at a second resolution. The second resolution is 600 lines per inch (LPI), for example; i.e., 600 dots per inch (dpi). The developing rollers 53 (see FIG. 2A) develop the latent images LI formed on the surfaces of the corresponding photosensitive drums 54 by supplying toner thereto, thereby forming toner images on the surfaces of the photosensitive drums 54. The toner images formed in this way are then transferred onto a sheet of printing medium P conveyed on the conveying belt 58.

The fixing unit 56 (see FIG. 2A) is disposed on the conveying path SR downstream of the conveying belt 58. The fixing unit 56 has a pair of rollers for applying heat and pressure to the toner images transferred onto the printing medium P in order to fix the toner to the printing medium P.

A2. Printing Process

Figure 3:
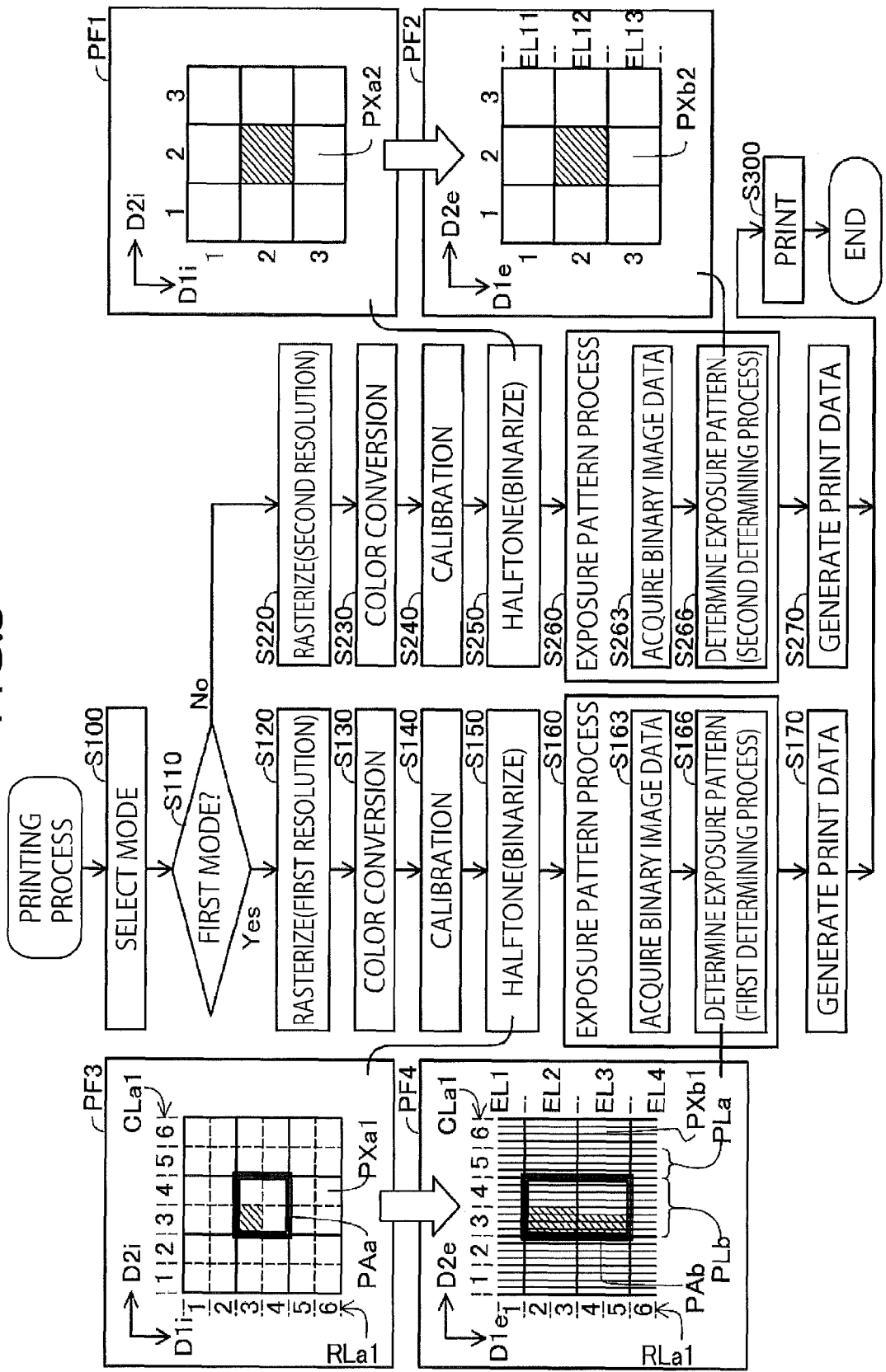
FIG. 3 is a flowchart illustrating steps in a printing process.

FIG. 3 is a flowchart illustrating steps in the printing process. The control unit 100 (see FIG. 1) begins the printing process in response to a user command. In S100 at the beginning of the printing process, the mode selection unit M140 selects the mode for the printing process based on the user command Two modes are available in the present embodiment. A first mode enhances the resolution in the printed image, while a second mode reduces the time required for processing image data in exchange for a lower resolution in the printed image. The user can input an instruction to specify a desired mode through operations on the operating unit 170, for example. The mode selection unit M140 then selects the mode according to the user's instruction. The control unit 100 executes steps S120-S170 when the mode selection unit M140 selects the first mode (S110: YES) and executes steps S220-S270 when the mode selection unit M140 selects the second mode (S110: NO).

A2-1. Second Mode

First, the printing process will be described for cases in which the second mode has been selected (S110: NO). In S220 the binary image data generation unit M110 performs a rasterization process to convert the input image data to bitmap data. The bitmap data includes pixel data expressing the color for each of a plurality of pixels. For example, pixel data for a single pixel may express a gradation value (one of 256 levels, for example) for each of the three color components red, green, and blue. In the second mode, the resolution of the bitmap data (pixel density) is a second resolution (600 dpi, for example). The resolution is determined based on the size of the printed image.

In S230 the binary image data generation unit M110 performs a color conversion process to convert the gradation values in the bitmap data to gradation values for the color components of toner used in the printing unit 200. In the present embodiment, the bitmap data resulting from this color conversion expresses a gradation value (one of 256 levels, for example) for each of the four color components cyan, magenta, yellow, and black. The color conversion process is performed using a profile (look-up table, for example) correlating pre-conversion pixel data with post-conversion pixel data.

In S240 the binary image data generation unit M110 performs a calibration process to calibrate the gradation values produced in S230 so that the actual densities of colors printed on the printing medium P change linearly in response to changes in the gradation values. Calibration is performed using a one-dimensional look-up table associating original gradation values with calibrated gradation values. A look-up table is provided for each of the color components (cyan, magenta, yellow, and black in this example).

In S250 the binary image data generation unit M110 performs a halftone process to generate binary image data for each of the C, M, Y, and K colors using the calibrated bitmap data. In the present embodiment, the binary image data generation unit M110 performs a halftone process to generate binary image data using the dither matrix data 136 (see FIG. 1). The binary image data generated in S250 expresses the densities for the plurality of pixels in one of the two values "0" and "1". Here, "0" indicates that the density of the pixel is 0% (i.e., no toner), while "1" indicates a density of 100% (i.e., toner). The resolution of the binary image data is the same as the resolution (second resolution) for the bitmap data generated in S220.

The dither matrix data 136 includes data for the first mode and data for the second mode, both of which represent a dither matrix for each of the C, M, Y, and K colors. The binary image data generation unit M110 generates binary image data for each of the CMYK colors using the corresponding dither matrices.

A first partial view PF1 in FIG. 3 shows a portion of the binary image data generated in S250. The binary image data in the first partial view PF1 includes nine pixels PXa2 arranged in three rows and three columns. Pixels in binary image data will hereinafter be referred to also as "binary pixels." A plurality of binary pixels PXa2 are arranged in a matrix along a first image direction D1i and a second image direction D2i that intersect each other (that are orthogonal to each other in the present embodiment). Shaded pixels PXa2 denote pixels with the density "1" and will hereinafter be referred to as "high-density binary pixels" or simply "high-density pixels." Non-shaded pixels PXa2 have a density of "0" and will hereinafter be referred to as "low-density binary pixels" or simply "low-density pixels." In the first partial view PF1, the pixel PXa2 in Row 2 and Column 2 is a high-density pixel. Note that the resolution in the first image direction D1$i$ and the resolution in the second image direction D2$i$ are both the second resolution (600 dpi, for example) for binary image data generated in the second mode of the present embodiment.

In S260 the exposure pattern process unit M120 determines exposure patterns using binary image data. One exposure pattern is determined for each of the C, M, Y, and K colors. Step S260 includes two sub-steps S263 and S266. In S263 the acquisition unit M122 acquires the binary image data from the binary image data generation unit M110. That is, the binary image data generation unit M110, after generating the binary image data, stores the data in the volatile memory 120, for example. The acquisition unit M122 then reads this binary image data from the volatile memory 120.

In S266 the determining unit M124 determines exposure patterns using the binary image data acquired in S263. Each exposure pattern stipulates exposure positions (positions to be exposed) in each of a plurality of exposure lines EL shown in FIG. 2C. More specifically, the exposure patterns determine which of the plurality of pixels are to be exposed.

A second partial view PF2 in FIG. 3 illustrates one portion of an exposure pattern determined in S266. The exposure pattern in the second partial view PF2 corresponds to the binary image data in the first partial view PF1. The second partial view PF2 in FIG. 3 illustrates nine pixels PXb2 arranged in three rows and three columns. Hereinafter, pixels in the exposure pattern will be called also "exposure process pixels." Further, exposure process pixels that are to be exposed will be called exposure pixels, while those that are not to be exposed will be called "non-exposure pixels." The range of exposure positions corresponds to the region occupied by exposure pixels.

The plurality of pixels PXb2 is arranged in a matrix along the first exposure direction D1$e$ corresponding to the first image direction D1$i$, and the second exposure direction D2$e$ corresponding to the second image direction D2$i$. In the present embodiment, the first exposure direction D1$e$ and second exposure direction D2$e$ are substantially orthogonal to each other.

The resolutions in both the first exposure direction D1$e$ and the second exposure direction D2$e$ are the second resolution for exposure patterns determined in the second mode of the present embodiment. Hence, pixels PXb2 of the exposure pattern have a one-on-one correspondence with the pixels PXa2 in the binary image data. The determining unit M124 selects exposure process pixels corresponding to positions of high-density binary pixels in the binary image data as pixels to be exposed. Shaded pixels PXb2 in FIG. 3 denote exposure pixels, while non-shaded pixels PXb2 denote non-exposure pixels. In the second partial view PF2 of FIG. 3, the pixel PXb2 in Row 2, Column 2 is a pixel to be exposed.

As described in FIG. 2C, the exposure lines EL are arranged at the second resolution along the first exposure direction D1$e$. Hence, one line constituting a plurality of pixels PXb2 aligned in the second exposure direction D2$e$ corresponds to one exposure line EL. In the sample second partial view PF2 of FIG. 3, the first line corresponds to a first exposure line EL11, the second line corresponds to a second exposure line EL12, and the third line corresponds to a third exposure line EL13. In the second mode, the determining unit M124 determines exposure positions (pixels PXb2 to be exposed) on a single exposure line EL extending in the second exposure direction D2$e$ based on one pixel line extending in the second image direction D2$i$ in the binary image data. An exposure pattern determined in this way renders a toner image whose resolution in the first exposure direction D1$e$ is the second resolution.

In S270 the print data generation unit M130 (see FIG. 1) generates print data representing the exposure patterns determined by the determining unit M124. In addition to the data representing the exposure patterns, the print data includes data for various commands used to control the control circuit 210.

In S300 the print data generation unit M130 transmits the print data generated in S270 to the printing unit 200. The control circuit 210 of the printing unit 200 (see FIG. 2) executes a printing operation according to the print data received from the print data generation unit M130. The printing process of FIG. 3 ends at the conclusion of the printing operation.

A2-2. First Mode

A2-2-1. Printing Process in the First Mode

Next, the printing process performed when the first mode is selected will be described. When the first mode has been selected (S110: YES), the process shown in S120-S150 is performed. This process is identical to that of S220-S250 described for the second mode, except that the resolutions of the bitmap data and binary image data are a first resolution (1200 dpi, for example), higher than the second resolution. Note that the binary image data generation unit M110 uses dither matrices for the first mode in S150.

A third partial view PF3 in FIG. 3 shows a portion of the binary image data generated in S150. Unlike the first partial view PF1 used in the second mode, the resolution in the first image direction D1$i$ and the resolution in the second image direction D2$i$ in the third partial view PF3 of the first mode are both the first resolution. The third partial view PF3 in this example has 36 binary pixels PXa1 arranged in six rows and six columns. Shaded binary pixels PXa1 denote high-density pixels. Hence, the binary pixel PXa1 positioned in Row 3, column 3 of the third partial view PF3 is a high-density pixel.

In S160 the exposure pattern process unit M120 determines exposure patterns using the binary image data. Step S160 includes two steps S163 and S166. S163 is identical to S263 described for the second mode.

In S166 the determining unit M124 determines one exposure pattern for each of C, M, Y, and K colors by using the binary image data acquired in S163. A fourth partial view PF4 in FIG. 3 shows a portion of the exposure pattern determined in S166. The exposure pattern in the fourth partial view PF4 corresponds to the binary image data in the third partial view PF3. As in the second mode, the exposure pattern in the first mode specifies exposure positions (positions to be exposed) for each of the plurality of exposure lines EL shown in FIG. 2C. Unlike in the second mode, however, the resolution of the plurality of exposure process pixels PXb1 in the second exposure direction D2$e$ is eight times the second resolution (four times the first resolution) in the first mode, or 4,800 dpi in this example. In other words, the resolution of the exposure process pixels PXb1 in the second exposure direction D2$e$ is set in the first mode eight times as high as that set in the second mode. So, during the first mode, the control circuit 210 sets the minimum time length (minimum pulse width), during which the laser light source 51 is kept ON or OFF under the pulse width control, to as short as one-eighth of the minimum time length set during the second mode. The resolution in the first exposure direction D1$e$ is the second resolution (same as in the second mode).

In the fourth partial view PF4, a row label RLa1 indicates the position (row number) for binary pixels in the first image direction D1$i$, while a column label CLa1 indicates the position (column number) for binary pixels in the second image direction D2*i*. These labels RLa1 and CLa1 are row numbers and column numbers, respectively, when the pattern of the binary image data overlaps the exposure pattern so that the image represented by the binary image data (hereinafter referred to as the "input image") is superimposed on the image represented by the exposure pattern.

A binary partial area PAa is indicated in the third partial view PF3, while an output partial area PAb is indicated in the fourth partial view PF4. The output partial area PAb is a region correlated with the binary partial area PAa. The binary partial area PAa is a block of binary pixels PXa1 in two rows and two columns. The output partial area PAb is a block of exposure process pixels PXb1 in two rows and eight columns. As shown in the fourth partial view PF4, the output partial area PAb overlaps two exposure lines (lines EL2 and EL3 in this example) adjacent to each other in the first exposure direction D1*e*. The binary partial area PAa is positioned so as to straddle the border of these two exposure lines (the third and fourth lines).

The determining unit M124 divides the plurality of binary pixels PXa1 in the binary image data into a plurality of binary partial areas PAa that do not overlap one another. The determining unit M124 then determines the final exposure pattern using these binary partial areas PAa. That is, the determining unit M124 determines an exposure pattern for one output partial area PAb correlated with each binary partial area PAa in the binary image data, and determines the final exposure pattern for the entire binary image data based on the exposure patterns determined for the output partial areas PAb correlated with all the binary partial areas PAa in the binary image data. More specifically, the determining unit M124 determines the final exposure pattern for the entire binary image data by superimposing the exposure patterns determined for the output partial areas PAb correlated with all the binary partial areas PAa in the binary image data. This step will be described later in greater detail.

In S170 the print data generation unit M130 (see FIG. 1) generates print data representing the exposure pattern, as in S270 of the second mode described earlier. In S300 the printing unit 200 executes a printing operation according to the print data generated in S170. The main scanning speed of the polygon mirror 51*c*, the rotational speed of the photosensitive drums 54, the resolution of the exposure lines EL in the first exposure direction D1*e*, and the conveying speed for conveying the printing medium P are identical between the first and second modes.

A2-2-2. Partial Exposure Patterns for Output Partial Areas

Figure 4:
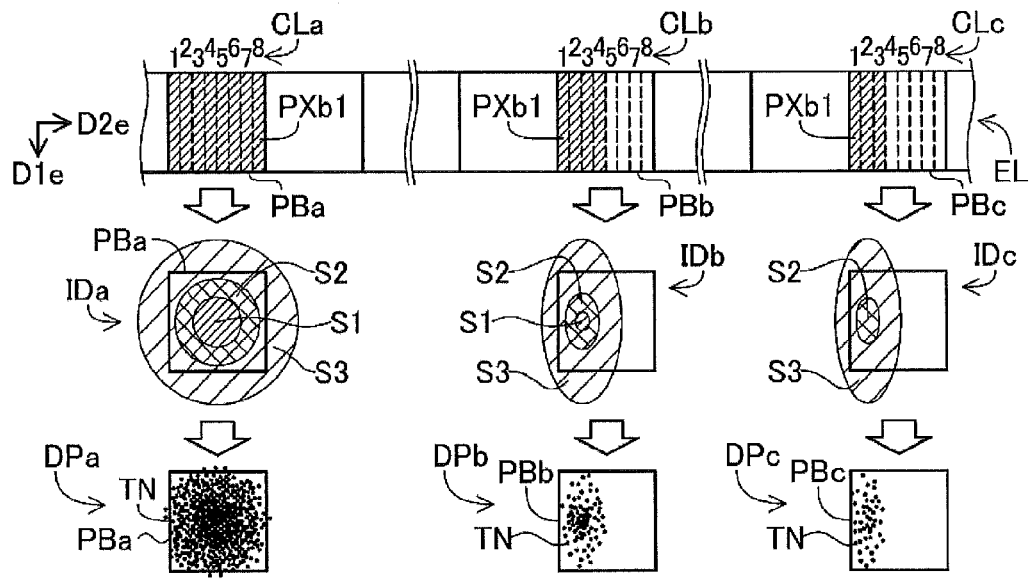
FIG. 4 is an illustration showing an example of exposure positions on a single exposure line, distributions of exposure intensities, and resulting toner images.

Next, the exposure pattern of the output partial area PAb shown in FIG. 3 (hereinafter referred to as a "partial exposure pattern") will be described. FIG. 4 shows an example of exposure positions (exposure pixels) on a single exposure line EL, distributions of exposure intensities, and resulting toner images. The example in FIG. 4 includes three pixel blocks PBa, PBb, and PBc, each of which is configured of eight continuous exposure process pixels PXb1 in the second exposure direction D2*e*. Hence, the shape and size of each blocks PBa, PBb, and PBc is identical to the shape and size of a single pixel PXb2 in the second mode described above (see FIG. 3). Column labels CLa, CLb, and CLc noted above the corresponding blocks PBa, PBb, and PBc indicate the pixel positions in the second image direction D2*i* (column numbers) for each of the blocks PBa, PBb, and PBc. In the following description, the "$i^{th}$ pixel" will be used to designate a pixel having column number i in a block of exposure process pixels arranged continuously in the second exposure direction D2*e*.

In the first block PBa, all of the first through eighth pixels PXb1 are exposure pixels. A first intensity distribution IDa in FIG. 4 shows the distribution of exposure intensities in the first block PBa. Exposure intensities in FIG. 4 are distributed in three levels: a strong region S1, a medium region S2, and a weak region S3. As shown in FIG. 4, the exposure intensity is stronger closer to the center of the first block PBa, and the three regions S1, S2, and S3 are formed as concentric circles. A first development pattern DPa in the same drawing shows the general distribution of toner TN in the first block PBa (i.e., the development results). Here, toner TN is distributed across nearly the entire first block PBa. This distribution of toner TN is attainable also with a single exposure pixel in the second mode described above (for example, the pixel PXb2 at Row 2, Column 2 in the second partial view PF2 of FIG. 3).

The exposure region (the weak region S3, for example) extends beyond the first block PBa. However, the density (amount) of toner TN is small in the weak region S3 since the exposure intensity for the weak region S3 is insufficient for depositing toner TN.

In the second block PBb, the first through fourth pixels PXb1 are exposure pixels, while the fifth through eighth pixels PXb1 are non-exposure pixels. In this case, the size of the exposure region in the second exposure direction D2*e* (the range of exposure positions) is smaller than that of the first block PBa. Therefore, the amount of exposure in the second block PBb is less than that in the first block PBa.

A second intensity distribution IDb in FIG. 4 shows the distribution of exposure intensities in the second block PBb. In this case, the sizes of the regions S1-S3 in the second exposure direction D2*e* are smaller than in the first intensity distribution IDa of the first block PBa. Further, the sizes of regions S1 and S2 having relatively strong exposure intensities are smaller also in the first exposure direction D1*e* because the fifth through eighth pixels PXb1 are non-exposure pixels and, hence, the laser light source 51*a* is controlled to turn off the laser beam LZ (see FIG. 2B) in a main scan before the intensity of the laser beam LZ becomes sufficiently large. As with the first block PBa, the weak region S3 in this case extends beyond the second block PBb in the first exposure direction D1*e*.

A second development pattern DPb in FIG. 4 shows the general distribution of toner TN in the second block PBb (i.e., the development results). As shown in FIG. 4, the toner TN is distributed thinly in the left half of the second block PBb.

In the third block PBc, the first through third pixels PXb1 are exposure pixels, while the fourth through eighth pixels PXb1 are non-exposure pixels. The size of the exposure region in the second exposure direction D2*e* is smaller than that in the second block PBb. Hence, the exposure amount in the third block PBc is less than that in the second block PBb.

A third intensity distribution IDc in FIG. 4 shows the general distribution of exposure intensities for the third block PBc. Unlike the second block PBb, a strong region S1 is not formed in the third block PBc. Further, the dimensions of the medium region S2 and weak region S3 in the second exposure direction D2*e* are smaller because the fourth through eighth pixels PXb1 are non-exposure pixels and, hence, the laser light source 51*a* is controlled to turn off the laser beam LZ during a main scan before the intensity of the laser beam LZ becomes sufficiently large. In the first exposure direction D1*e*, the weak region S3 expands beyond the third block PBc, as with the blocks PBa and PBb described above.

A third development pattern DPc in FIG. 4 shows the general distribution of toner TN in the third block PBc (i.e., the development results). In this case, the toner TN is distributed in the third block PBc within a region on the left side of the third block PBc, and is distributed thinner than in the second block PBb.

As described above in the present embodiment, the diameter of the laser beam LZ irradiated onto the surface of the photosensitive drum 54 is large enough in the first exposure direction D1e to extend beyond a single exposure line EL being targeted for exposure (although the intensity of the laser beam LZ in the region outside the targeted exposure line EL is not strong enough to form a high-density toner TN region with just a single exposure). Hence, when exposing two exposure lines EL adjacent to each other in the first exposure direction D1e, the intensity distribution in one exposure line can affect the intensity distribution in the other exposure line.

Figure 5:
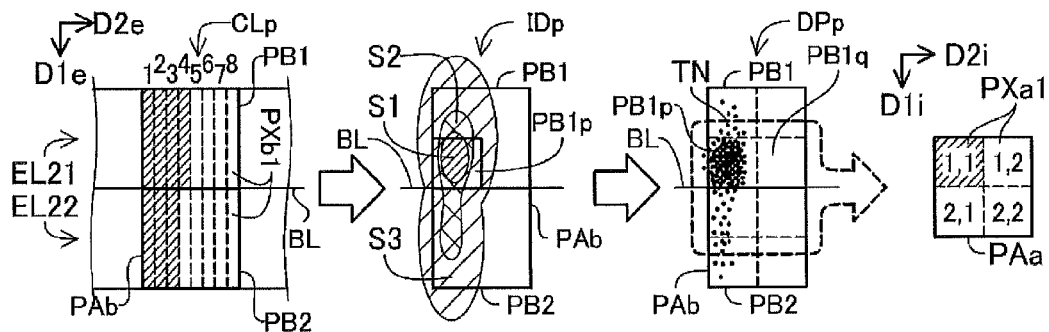
FIG. 5 is an illustration showing an example of exposure positions, exposure intensity distributions, and toner images for two exposure lines positioned adjacent to each other in a first exposure direction.

FIG. 5 shows an example of exposure positions, exposure intensity distributions, and toner images for two exposure lines EL21 and EL22 positioned adjacent to each other in the first exposure direction D1e. The exposure lines EL21 and EL22 overlap an output partial area PAb in the example of FIG. 5. Here, the portion of the output partial area PAb overlapped by the exposure line EL21 (all eight pixels PXb1) will be called a first block PB1, while the portion of the output partial area PAb overlapped by the exposure line EL22 (all eight pixels PXb1) will be called a second block PB2. The exposure pattern for the first block PB1 in the example of FIG. 5 is identical to that of the second block PBb in FIG. 4. The exposure pattern of the second block PB2 in FIG. 5 is identical to that of the third block PBc in FIG. 4.

An intensity distribution IDp in FIG. 5 shows the distribution of exposure intensities in the output partial area PAb. The exposure pattern of the first block PB1 in this example produces the same intensity distribution as the second intensity distribution IDb in FIG. 4. The exposure pattern of the second block PB2 produces the same intensity distribution as the third intensity distribution IDc in FIG. 4. The intensity distribution IDp in FIG. 5 is a superposition of these intensity distributions.

In the first block PB1, the weak region S3 expanding from the second block PB2 overlaps the second intensity distribution IDb (see FIG. 4). As a result, the portion of the first block PB1 near the second block PB2 (a partial region PB1p in the lower left of the first block PB1) has a stronger exposure intensity. The strong region S1 and medium region S2 are expanded in the partial region PB1p.

In the second block PB2, the weak region S3 expanding from the first block PB1 overlaps the third intensity distribution IDc (see FIG. 4). As a result, the exposure intensity in the portion of the second block PB2 nearest the first block PB1 is stronger (the medium region S2 is expanded). Note that the strong region S1 is not produced in the second block PB2 in the example of FIG. 5.

A development pattern DPp in FIG. 5 shows the general distribution of toner TN in the output partial area PAb (i.e., the development results). In this case, the density (quantity) of toner TN in the partial region PB1p of the first block PB1 is sufficiently large to form a visible dot. The density of toner TN remains low outside the partial region PB1p. Hereinafter, a region having a sufficiently high density of toner TN to form a visible dot will be called a "high density development region."

The partial region PB1p corresponds to a single binary pixel in a binary partial area PAa. The binary partial area PAa associated with the output partial area PAb is shown on the right side of the development pattern DPp in FIG. 5. The partial region PB1p shown in the development pattern DPp is substantially the same region as the binary pixel PXa1 in the upper left of the binary partial area PAa. Note that a pair of numbers (e.g., "1, 1") is included in each of the four binary pixels PXa1 of the binary partial area PAa. The first number is the row number in the binary partial area PAa, and the second number is the column number. Hereinafter, the positions of pixels in the binary partial area PAa will be identified using the row number and column number.

Figure 6:
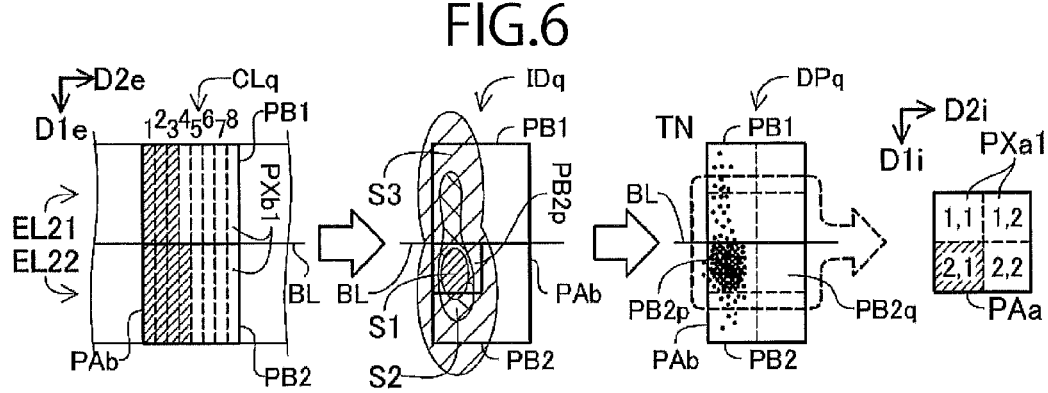
FIG. 6 is an illustration showing a different example of the exposure positions, exposure intensity distributions, and toner images for the two exposure lines positioned adjacent to each other in the first exposure direction.

FIG. 6 gives a different example of exposure positions, exposure intensity distributions, and toner images for two exposure lines EL21 and EL22 positioned adjacent to each other in the first exposure direction D1e. Here, the exposure patterns for the first block PB1 and second block PB2 in the example of FIG. 5 have been switched. An intensity distribution IDq and a development pattern DPq in this example can be obtained by inverting the intensity distribution IDp and development pattern DPp in FIG. 5 about a borderline BL between the two blocks PB1 and PB2. Consequently, the strong region S1 and medium region S2 in the example of FIG. 6 expand within a partial region PB2p in the upper left of the second block PB2, making the partial region PB2p a high-density development region. The partial region PB2p corresponds to the binary pixel PXa1 in Row 2, Column 1 of the binary partial area PAa.

By controlling the balance of light exposure between two exposure lines EL21 and EL22 within an output partial area PAb, it is possible to control the positions of high-density development regions (e.g., partial regions PB1p and PB2p) in the first exposure direction D1e at a first resolution higher than the resolution of the exposure lines (the second resolution).

By controlling the positions of exposure pixels in the second exposure direction D2e, it is possible to control the positions of high-density development regions in the second exposure direction D2e at the first resolution. For example, by setting only the fifth through eighth pixels PXb1 as exposure pixels in the first block PB1 in the example of FIG. 5 and setting only the sixth through eighth pixels PXb1 as exposure pixels in the second block PB2, a partial region PB1q in the lower right of the first block PB1 can be set as a high-density development region. The partial region PB1q corresponds to the binary pixel PXa1 in Row 1, Column 2. By similarly modifying the position of the exposure pixels in the example of FIG. 6, a partial region PB2q in the upper right of the second block PB2 can be formed as a high-density development region. The partial region PB2q corresponds to the binary pixel PXa1 in Row 2, Column 2.

Figure 7:
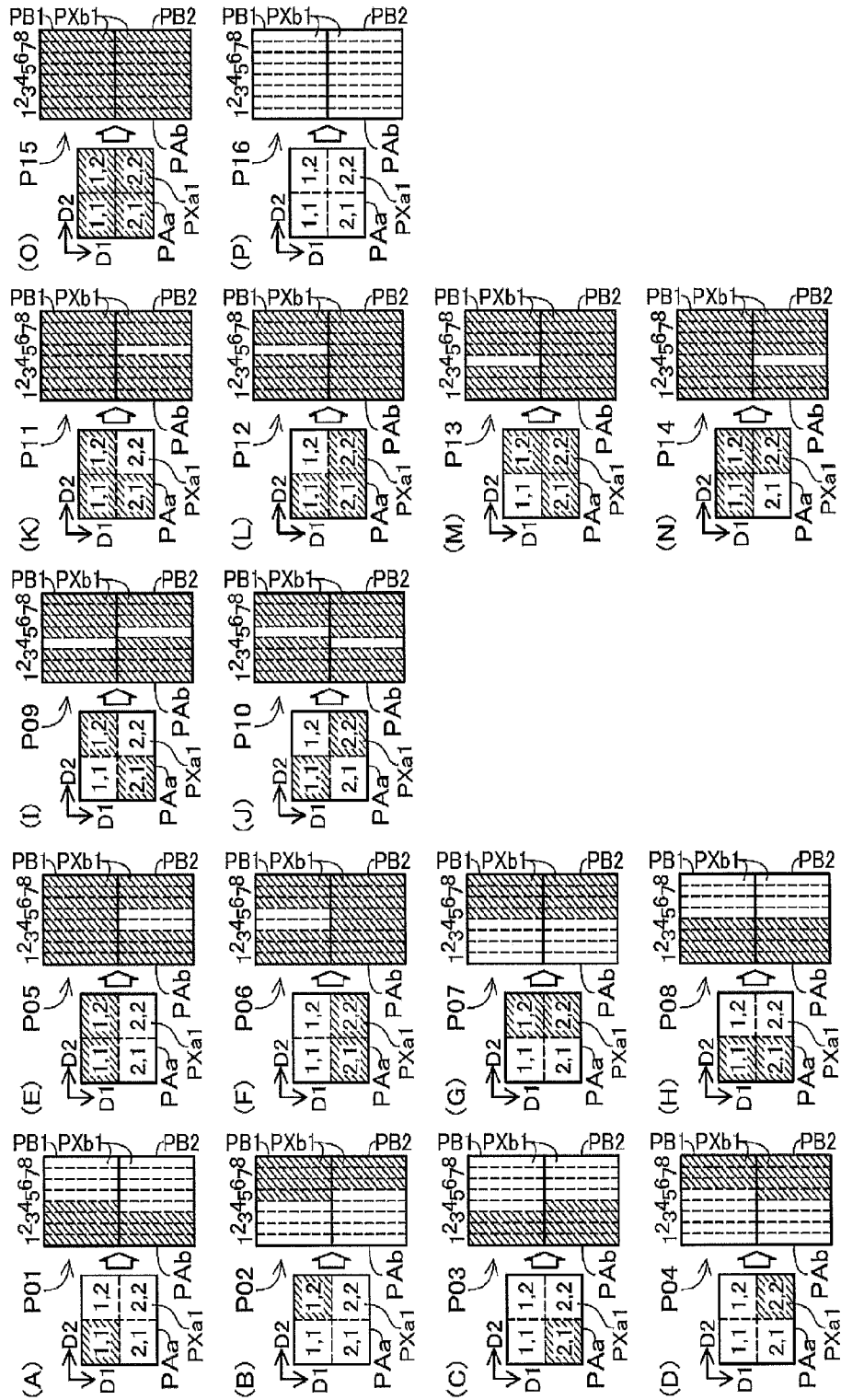
FIG. 7 is an illustration showing correlations between patterns of a binary partial area and partial exposure patterns of an output partial area.

FIG. 7 shows correlations between patterns of the binary partial area PAa and partial exposure patterns of the output partial area PAb. These correlations are preset in the partial exposure pattern data 138 (see FIG. 1). FIG. 7 shows all sixteen possible patterns of the binary partial area PAa and the corresponding sixteen partial exposure patterns P01-P16. High-density pixels in the binary partial areas PAa are shaded, and exposure pixels in the output partial area PAb are shaded. In FIG. 7, the first image direction is identical to the first exposure direction and is indicated in the drawing as a first direction D1. Similarly, the second image direction is identical to the second exposure direction and is indicated in the drawing as a second direction D2.

The first through fourth patterns P01-P04 are the partial exposure patterns corresponding to binary partial areas PAa having only a single high-density pixel. The first pattern P01 is identical to the pattern in FIG. 5, and the third pattern P03 is identical to the pattern in FIG. 6. The second pattern P02 is a mirror image of the first pattern P01 (i.e., first pattern P01 flipped horizontally) and corresponds to the binary partial area PAa whose binary pixel PXa1 in Row 1, Column 2 is a high-density pixel. The fourth pattern P04 is a mirror image of the third pattern P03 and corresponds to the binary partial area PAa whose pixel PXa1 in Row 2, Column 2 is a high-density pixel. Hereinafter, partial exposure patterns correlated with patterns having only a single high-density pixel will be called "unit exposure patterns."

The fifth through tenth patterns P05-P10 are partial exposure patterns for binary partial areas PAa having two high-density pixels; the eleventh through fourteenth patterns P11-P14 are partial exposure patterns for binary partial areas PAa having three high-density pixels; the fifteenth pattern P15 is a partial exposure pattern for a binary partial area PAa whose binary pixels PXa1 are all four high-density pixels; and the sixteenth pattern P16 is a partial exposure pattern for a binary partial area PAa having no high-density pixels. In the present embodiment, all pixels PXb1 in the sixteenth pattern P16 are non-exposure pixels. When the binary partial area PAa has two or more high-density pixels, the corresponding partial exposure pattern is identical to a pattern obtained by superimposing unit exposure patterns corresponding to the positions of the high-density pixels. For example, the ninth pattern P09 is a partial exposure pattern selected for the binary partial area PAa having high-density pixels only in Row 2, Column 1 and Row 1, Column 2. Hence, regions of exposure positions in the ninth pattern P09 are identical to the regions of exposure positions in a pattern obtained by superimposing the third pattern P03 selected for the binary partial area PAa having a high-density pixel in only Row 2, Column 1, with the second pattern P02 selected for the binary partial area PAa having a high-density pixel only in Row 1, Column 2. Other partial exposure patterns are similarly configured.

A2-2-3. Determining Exposure Pattern

Figure 8:
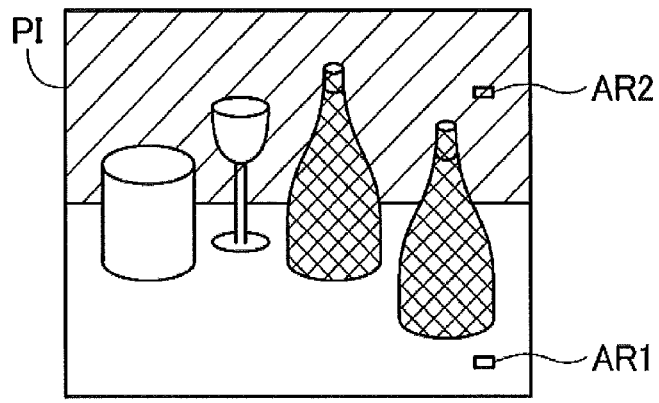
FIG. 8 is an illustration showing a sample image to be printed.

In S166 of FIG. 3, the determining unit M124 determines the exposure pattern by referencing the correlations in FIG. 7 (i.e., the partial exposure pattern data 138). FIG. 8 shows a sample image PI to be printed. The image PI includes a first partial region AR1, and a second partial region AR2 that has a higher density (i.e., is darker) than the first partial region AR1.

Figure 9A:
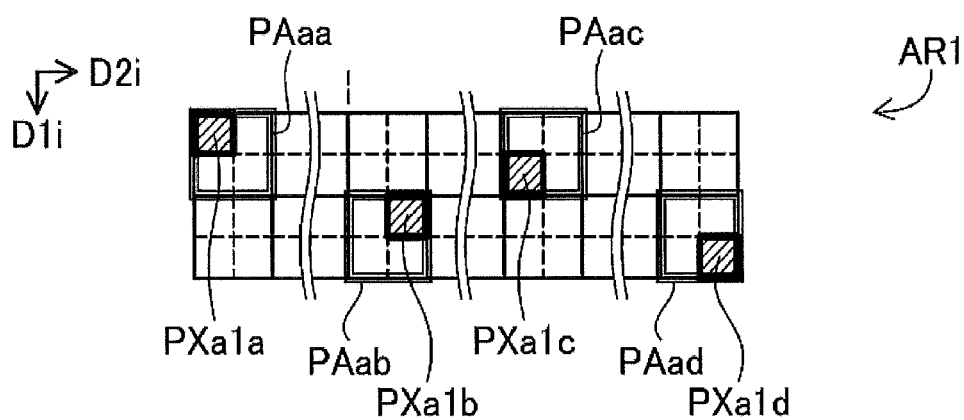
FIG. 9A is illustration showing a sample portion of binary image data representing a first partial region in the sample image of FIG. 8.
Figure 9B:
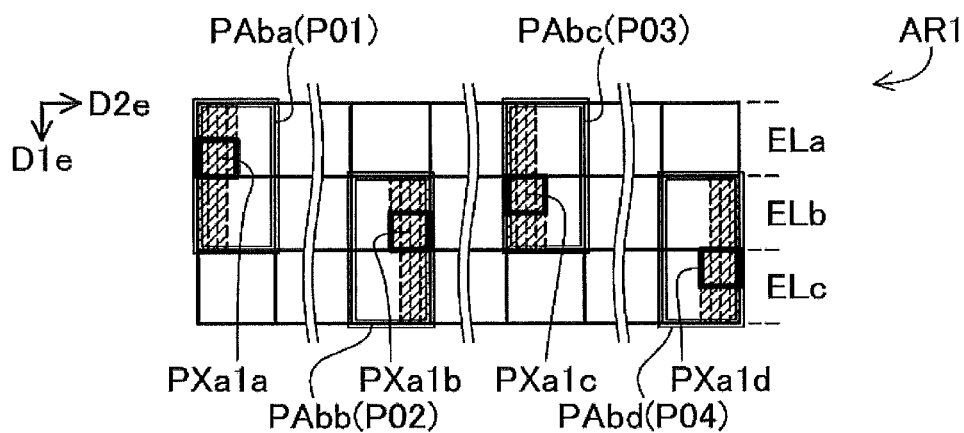
FIG. 9B is an illustration showing a sample exposure pattern for the first partial region.

FIG. 9A shows a sample portion of the binary image data representing the first partial region AR1. FIG. 9B shows a sample exposure pattern for the first partial region AR1. The pattern shown in FIG. 9B is for one toner color (for example, magenta toner). In the example of FIG. 9A, four binary pixels PXa1a-PXa1d are high-density pixels. These four high-density pixels are separated from each other. In the drawing, four binary partial areas PAaa-PAad corresponding to the four binary pixels PXa1a-PXa1d are delineated by double lines. These four binary partial areas PAaa-PAad are also separated from each other. The high-density binary pixels PXa1a-PXa1d have the following positions within the corresponding binary partial areas PAaa-PAad.

1) First binary pixel PXa1a: upper left pixel in the first binary partial area PAaa
2) Second binary pixel PXa1b: upper right pixel in the second binary partial area PAab
3) Third binary pixel PXa1c: lower left pixel in the third binary partial area PAac
4) Fourth binary pixel PXa1d: lower right pixel in the fourth binary partial area PAad FIG. 9B shows four output partial areas PAba-PAbd corresponding to the four binary partial areas PAaa-PAad. The output partial areas PAba-PAbd are all separated from each other. The partial exposure patterns for the output partial areas PAba-PAbd are determined according to the layout of the high-density pixels within the binary partial areas PAaa-PAad (see FIG. 9A), as follows.

1) First output partial area PAba: first pattern P01
2) Second output partial area PAbb: second pattern P02
3) Third output partial area PAbc: third pattern P03
4) Fourth output partial area PAbd: fourth pattern P04

As shown in FIGS. 5 and 6, the first through fourth patterns P01-P04 can control regions in which toner is deposited (high-density development regions) at the first resolution in both the first exposure direction D1e and second exposure direction D2e. Therefore, when a plurality of high-density binary pixels are laid out apart from each other, as in the example of FIG. 9A, these patterns can reproduce a toner image expressed in the first resolution, even though the plurality of exposure lines (exposure lines ELa-ELc in the example of FIG. 9B) have a lower second resolution in the first exposure direction D1e.

Figure 10:
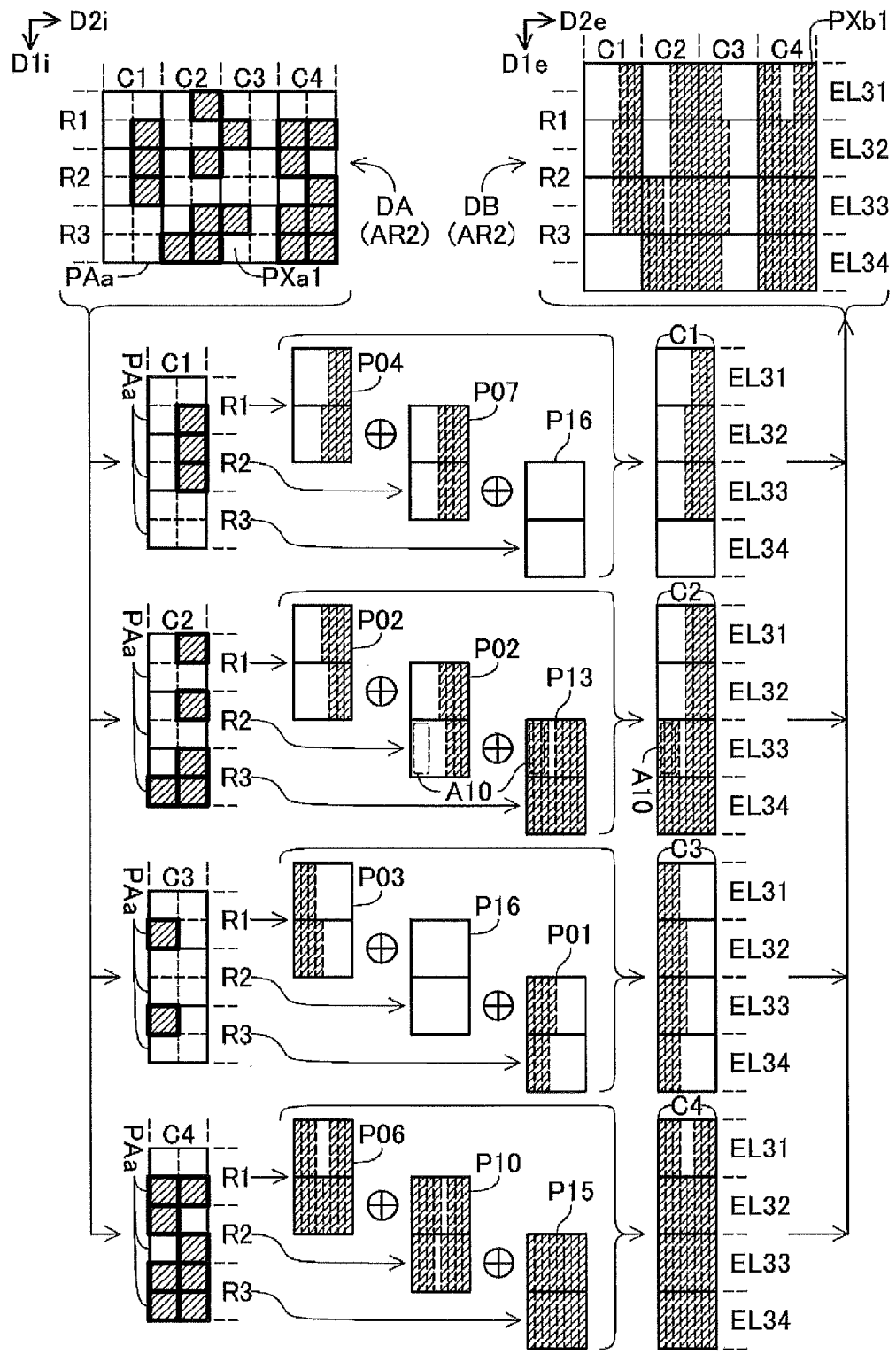
FIG. 10 is an illustration showing sample binary image data and an exposure pattern for a second partial region in the sample image of FIG. 8.

FIG. 10 shows sample binary image data and exposure patterns for the second partial region AR2. A binary pattern DA denotes a portion of the binary image data representing the second partial region AR2. The binary partial areas PAa in the binary pattern DA are depicted with solid lines, while the binary pixels PXa1 are depicted with dashed lines. The binary pattern DA is a region configured of twelve binary partial areas PAa arranged in three rows and four columns, i.e., a region configured of forty-eight binary pixels PXa1 arranged in six rows and eight columns. Shaded binary pixels PXa1 in the binary pattern DA are high-density binary pixels. Since the second partial region AR2 is darker than the first partial region AR1 (see FIG. 9A), high-density pixels in the second partial region AR2 have a greater density than those in the first partial region AR1.

An exposure pattern DB is the pattern for a region corresponding to the second partial region AR2 (four exposure lines EL31 to EL34). Shaded pixels PXb1 in the exposure pattern DB are exposure pixels.

The determining unit M124 determines the partial exposure pattern of an output partial area PAb for each of the plurality of binary partial areas PAa and obtains a final exposure pattern by superimposing these partial exposure patterns. FIG. 10 shows the combination of partial exposure patterns for each of four columns C1, C2, C3, and C4 of binary partial areas PAa. The following is an example of exposure patterns determined for the second column C2 of binary partial areas PAa.

The second column C2 includes three continuous binary partial areas PAa in the first image direction D1i: a first row R1, second row R2, and third row R3. The determining unit M124 determines a partial exposure pattern for each binary partial area PAa by referencing the correlations in FIG. 7 (the partial exposure pattern data 138). In the example of FIG. 10, partial exposure patterns are determined as follows.

1) First row R1: second pattern P02
2) Second row R2: second pattern P02
3) Third row R3: thirteenth pattern P13

The determining unit M124 determines the exposure pattern obtained by superimposing the partial exposure patterns for all binary partial areas PAa in the second column C2 as the final exposure pattern for the second column C2. A similar process is performed for the other columns C1, C3, and C4.

As described above in the first embodiment, the distribution of exposure amounts in the output partial area PAb in the first exposure direction D1e differs according to the layout of high-density binary pixels in the binary partial area PAa, at least in the first image direction D1i, as shown in FIG. 7. This makes it possible to achieve exposure suitable for the arrangement of high-density binary pixels in the first image direction D1*i* expressed in a relatively high first resolution. More specifically, the toner image can be formed at a finer resolution in the first exposure direction D1*e* than the resolution of the exposure pattern (second resolution; see the example in FIGS. 5 and 6).

The distribution of exposure amounts along the first exposure direction D1*e* can be identified according to the distribution of the total number of exposure pixels (the size of the range of positions to be exposed) in the first exposure direction D1*e*. For example, the relative exposure amount in the first block PB1 of the first pattern P01 of FIG. 7 is "4"; and the relative exposure amount in the second block PB2 is "3". Thus, the distribution of exposure amounts along the first exposure direction D1*e* can be identified as "4, 3". Similarly, the layout of high-density binary pixels along the first image direction D1*i* can be identified by the distribution of total number of high-density binary pixels along the first image direction D1*i*. For example, in the binary partial area PAa corresponding to the first pattern P01 shown in FIG. 7, the first line has a total of "1" high-density pixels, while the second line has a total of "0" high-density pixels. Therefore, the layout (distribution) of high-density pixels in the first image direction D1*i* can be identified as "1, 0".

In this way, the determining unit M124 (see FIG. 1) modifies the total number of exposure pixels (range of exposure positions) in the output partial area PAb for each of two exposure lines (blocks PB1 and PB2) to control the distribution of exposure amounts along the first exposure direction D1*e*. Through this control, the determining unit M124 can implement exposure suited to the layout (of high-density pixels) along the first image direction D1*i* expressed in the first resolution.

In the first embodiment, when the distribution of high-density pixels in a binary partial area PAa is not uniform in the first image direction D1*i*, as with patterns P01-P06 and P11-P14 of FIG. 7, exposure positions (positions in the second exposure direction D2*e*) for one of the first block PB1 and second block PB2 of the partial exposure pattern includes at least one position not included in the exposure positions of the other block. For example, exposure positions (exposure pixels) in the first block PB1 for the first pattern P01 includes the fourth pixel PXb1, which is a non-exposure pixel in the second block PB2. By setting exposure positions to be nonuniform between the first block PB1 and second block PB2 (i.e., between the first line and second line in the output partial area PAb) in this way when the distribution of high-density pixels along the first image direction D1*i* is not uniform in the binary partial area PAa, the determining unit M124 can achieve exposure suited to the layout of high-density pixels in the first image direction D1*i*.

Further, when the total number of high-density pixels in the binary partial area PAa is two or greater in the first embodiment, the partial exposure pattern is identical to a pattern obtained by superimposing unit exposure patterns corresponding to the positions of the high-density pixels, as described with reference to FIG. 7. Thus, the process of determining the exposure pattern can be simplified. For example, the partial exposure pattern data 138 may be configured to stipulate only the four unit exposure patterns P01-P04. The determining unit M124 can then determine any partial exposure pattern by suitably combining the unit exposure patterns P01-P04.

The printing process in the first embodiment can be performed in either the first mode or the second mode, as described with reference to FIG. 3. In both the first and second modes, exposure patterns function to irradiate a plurality of lines extending in the second exposure direction D2*e* one after another in the first exposure direction D1*e* at the second resolution. That is, the resolution of the exposure pattern in the first exposure direction D1*e* is the second resolution. Therefore, the exposure process can be performed at the same speed in the first mode and second mode (in other words, the conveying speed for the printing medium P is the same). By selecting the first mode, the user can obtain a printed image with a higher resolution than that in the second mode while maintaining the time required for the exposure process similar to that required in the second mode. The resolution of bitmap data and binary image data in the second mode is lower than that in the first mode. Therefore, processing image data in the second mode (S220-S260 of FIG. 3) can be performed in less time than that required for processing image data in the first mode (S120-S160 of FIG. 3). Further, since the printing unit 200 can be configured to execute printing operations at the second resolution in the first exposure direction D1*e*, which is lower than the first resolution, there is less chance of the printing unit 200 becoming structurally complex.

B. Second Embodiment

Figure 11:
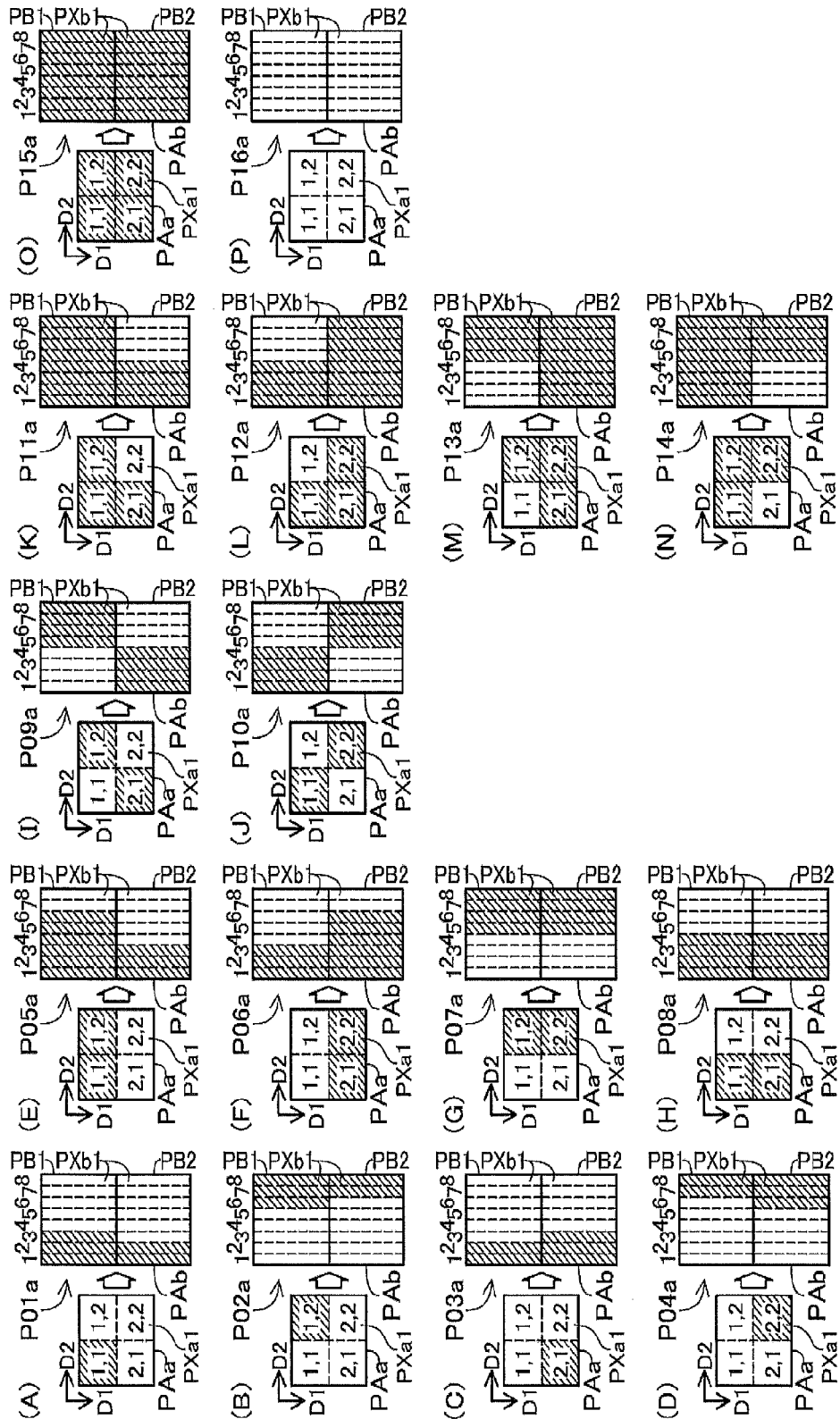
FIG. 11 is an illustration showing correlations between the patterns of a binary partial area and partial exposure patterns of the output partial area according to a second embodiment.

FIG. 11 illustrates a second embodiment of the partial exposure patterns. According to the second embodiment, sixteen partial exposure patterns P01*a*-P16*a* shown in FIG. 11 are used in place of the partial exposure patterns P01-P16 shown in FIG. 7. Unlike the partial exposure patterns in FIG. 7, at least a portion of the partial exposure patterns in FIG. 11 differs from a pattern that can be obtained by superimposing unit exposure patterns when the single binary partial area PAa includes a plurality of high-density pixels. The partial exposure patterns in FIG. 11 are particularly designed to reduce the possibility of the high-density development region (region in which the toner TN has a high density) expands unexpectedly. The printer employing the partial exposure patterns of FIG. 11 has a structure identical to that of the printer 900 in FIG. 1 (where the partial exposure pattern data 138 stipulates the partial exposure patterns in FIG. 11). The printing process in the second embodiment is similar to the process of FIG. 3 described in the first embodiment, except that the partial exposure patterns in FIG. 11 are used in place of the patterns in FIG. 7.

Figure 12A:
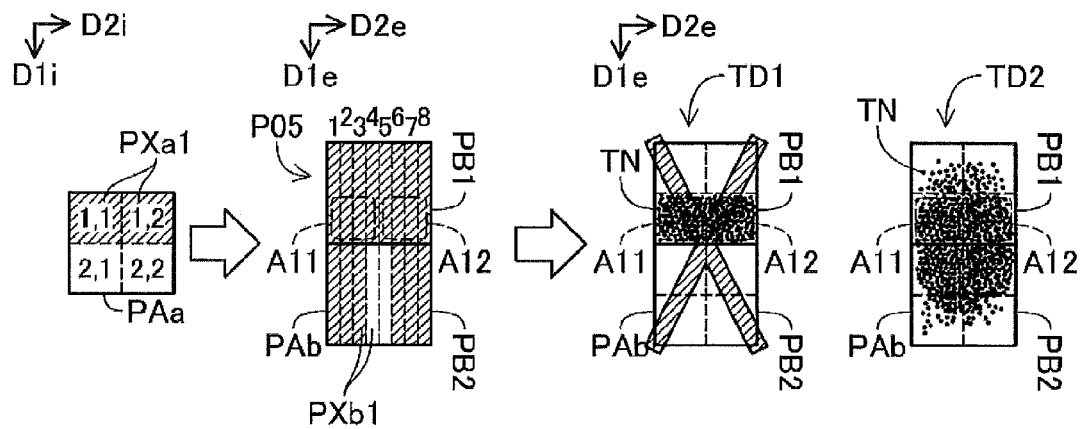
Figure 12B:
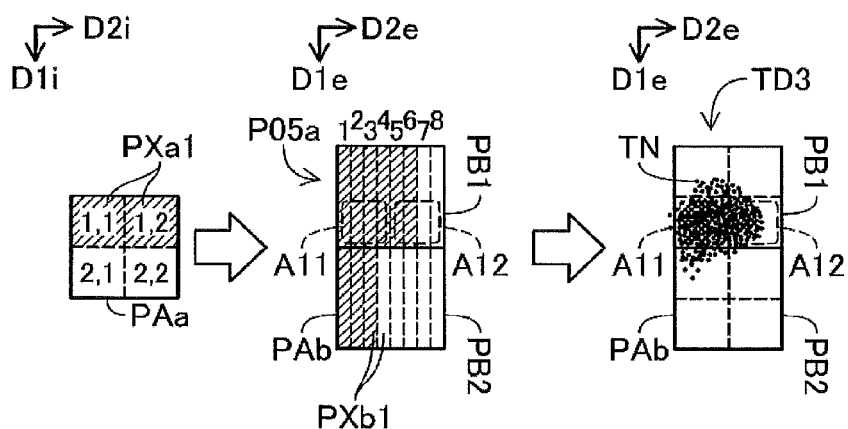

FIGS. 12A and 12B show partial exposure patterns and the resulting toner distributions when a single binary partial area PAa includes a plurality of high-density binary pixels. FIG. 12A shows an example according to the first embodiment, while FIG. 12B shows an example according to the second embodiment. In this example, the binary pixels PXa1 at positions Row 1, Column 1 and Row 1, Column 2 in the binary partial area PAa are high-density pixels. In the first embodiment, the fifth pattern P05 (see FIG. 7) is used as the partial exposure pattern for the output partial area PAb. In the first block PB1, all of the first through eighth pixels PXb1 are exposure pixels. In the second block PB2, the fourth and fifth pixels PXb1 are non-exposure pixels, while the remaining pixels are exposure pixels.

A first distribution TD1 in FIG. 12A indicates the ideal distribution of toner TN (development results), while a second distribution TD2 indicates the actual distribution of toner TN that may actually occur. In the ideal distribution of toner TN, there are only two high-density development regions: region A11 corresponding to Row 1, Column 1 in the binary partial area PAa, and region A12 corresponding to Row 1, Column 2. However, the exposure positions in the fifth pattern P05 (shaded positions) expand beyond regions A11 and A12. Therefore, the high-density development regions can actually expand beyond the regions A11 and A12, as indicated by the second distribution TD2.

In the second embodiment shown in FIG. 12B, the fifth pattern P05a in FIG. 11 is used as the partial exposure pattern for the output partial area PAb. In the first block PB1, the first through sixth pixels PXb1 are exposure pixels, while the seventh and eighth pixels PXb1 are non-exposure pixels. In the second block PB2, the first through third pixels PXb1 are exposure pixels, while the fourth through eighth pixels PXb1 are non-exposure pixels. Hence, the fifth pattern P05a according to the second embodiment has two fewer exposure pixels in the first block PB1 than the fifth pattern P05 according to the first embodiment and three fewer exposure pixels in the second block PB2. Thus, the fifth pattern P05a of the second embodiment can produce a more compact high-density development region than that in the first embodiment. In the second embodiment, the distribution of toner TN (development results) can be concentrated in the regions A11 and A12, as indicated by a third distribution TD3 in FIG. 12B. Hence, the fifth pattern P05a of the second embodiment can reduce the likelihood of the high-density development region expanding unexpectedly.

The other patterns P01a-P16a in FIG. 11 are similarly configured to prevent high-density development regions from expanding unexpectedly. Specifically, the four patterns P01a-P04a corresponding to binary partial areas PAa with a single high-density pixel have one fewer exposure pixel in each of the blocks PB1 and PB2 than the corresponding patterns P01-P04 in FIG. 7. The eight patterns P05a, P06a, and P09a-P14a corresponding to binary partial areas PAa with two or more high-density pixels produce fewer exposure pixels in at least one of the blocks PB1 and PB2 than the corresponding patterns P05, P06 and P09-P14 in FIG. 7.

Figure 13:
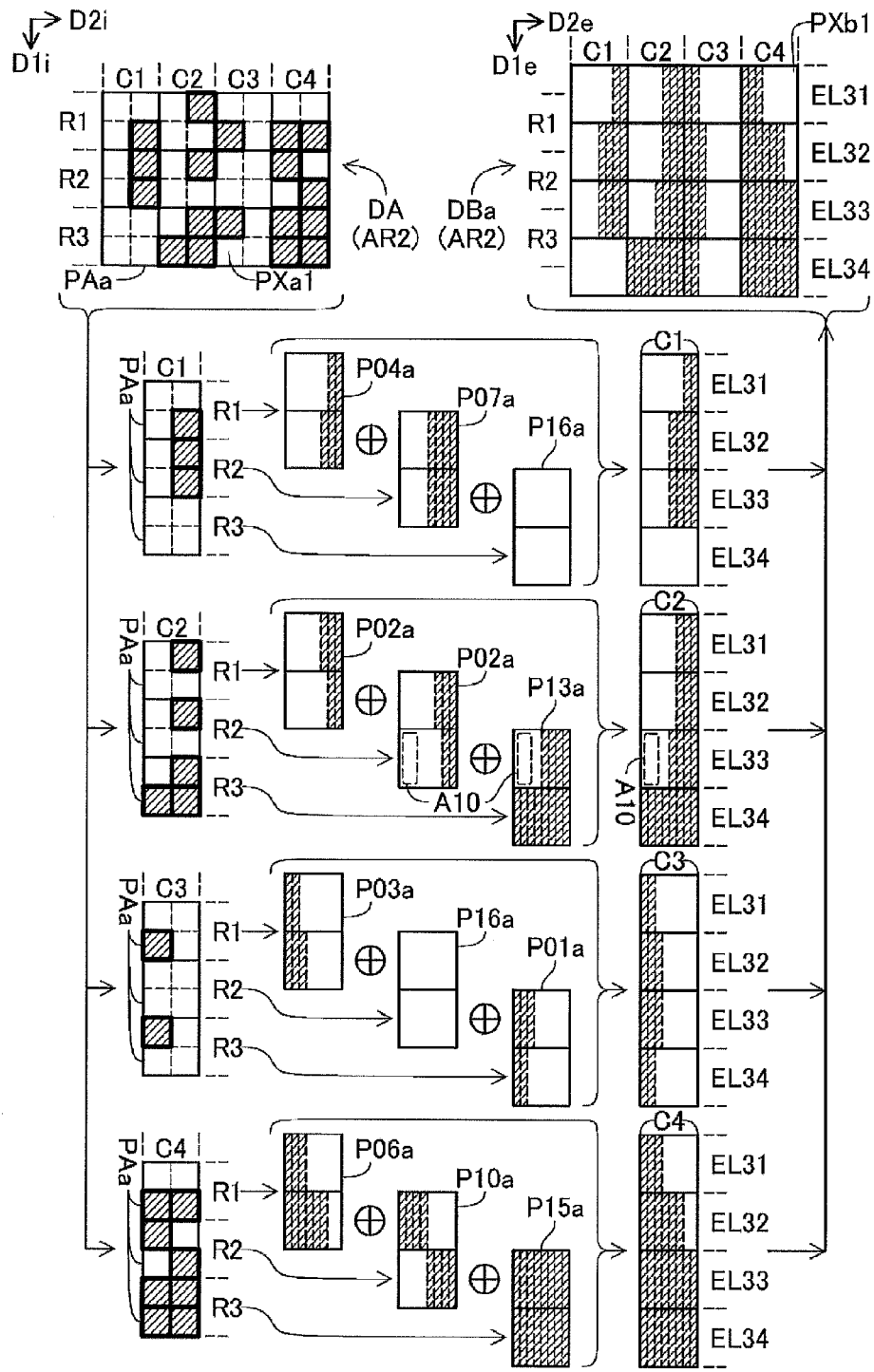
FIG. 13 is an illustration showing an exposure pattern determined according to the second embodiment for the second partial region in the sample image shown in FIG. 8.

FIG. 13 shows an exposure pattern DBa for the second partial region AR2 (see FIG. 8). As in FIG. 10, FIG. 13 shows the binary pattern DA, combinations of partial exposure patterns for each of the four columns C1, C2, C3, and C4 of binary partial areas PAa, and the resulting exposure pattern DBa. The binary pattern DA is identical to that in FIG. 10.

Using the correlations of the second embodiment shown in FIG. 11, the determining unit M124 determines partial exposure patterns for each of the binary partial areas PAa and superimposes these partial exposure patterns to obtain a final exposure pattern. For example, the partial exposure patterns for the binary partial areas PAa in the second column C2 are determined as follows.
1) First row R1: second pattern P02a
2) Second row R2: second pattern P02a
3) Third row R3: thirteenth pattern P13a The determining unit M124 determines the final exposure pattern for the second column C2 to that obtained by superimposing the partial exposure patterns for all binary partial areas PAa in the second column C2. Compared to the first embodiment in FIG. 10, the second column C2 in FIG. 13 has less area to be exposed. For example, a partial region A10 in the third exposure line EL33 according to the first embodiment shown in FIG. 10 is a region to be exposed, but the partial region A10 is not exposed in the second embodiment shown in FIG. 13.

There are also fewer areas to be exposed (a fewer number of exposure pixels) in the exposure pattern DBa of FIG. 13 than in the exposure pattern DB of FIG. 10, despite both exposure patterns being produced for the same binary pattern DA. Therefore, the second embodiment reduces the potential for high-density development regions expanding unexpectedly.

Further, patterns employed in the second embodiment shown in FIG. 11 for binary partial areas PAa having two or more high-density pixels (partial exposure patterns P05a-P15a) are not simply obtained by superimposing the unit exposure patterns P01a-P04a associated with the positions of the high-density pixels in the binary partial area PAa, but differ at least partially from the superimposed patterns. Therefore, the partial exposure patterns according to the second embodiment can achieve exposure suited to the layout of the high-density pixels.

For example, the ninth pattern P09a in FIG. 11 is selected when only pixels in Row 2, Column 1 and Row 1, Column 2 of the binary partial area PAa are high-density pixels. Assuming that the partial exposure pattern for this example was generated simply by superimposing the third pattern P03a selected when only the pixel in Row 2, Column 1 is a high-density pixel and the second pattern P02a selected when only the pixel in Row 1, Column 2 is a high-density pixel, then the first and second pixels PXb1 in the first block PB1 would be set to exposure pixels owing to the third pattern P03a and the seventh and eighth pixels PXb1 in the second block PB2 would be set to exposure pixels owing to the second pattern P02a. However, these pixels are set to non-exposure pixels in the ninth pattern P09a according to the second embodiment. Therefore, these patterns can reduce the potential of toner density increasing in unexpected areas (for example, the area corresponding to Row 1, Column 1 in the binary partial area PAa).

By removing at least a portion of the exposure positions in an exposure pattern obtained by simply superimposing unit exposure patterns corresponding to the positions of high-density pixels from the exposure areas in the actual exposure pattern, the second embodiment can reduce the potential for excessive exposure.

Further, in areas of an image representing the edge of an object, such as a photo, text, or the like, there is a high probability that there will be at least one low-density binary pixel and two or more neighboring high-density pixels in a single binary partial area PAa. In the second embodiment, the partial exposure patterns associated with such binary partial areas PAa (patterns P05a-P08a and P11a-P14a in FIG. 11) are configured to reduce the possibility of high-density development regions expanding unintentionally. Hence, in the first mode, edges of an object can be printed at a higher resolution than the second resolution. As a result, exposure patterns determined in the first mode can print images that make the observer feel that the resolution is as high as when the resolution of the exposure patterns in the first exposure direction D1e (the resolution of the plurality of exposure lines EL) is the first resolution.

The partial exposure patterns according to the second embodiment in FIG. 11 have various characteristics similar to the partial exposure patterns in FIG. 7. For example, the distribution of exposure along the first exposure direction D1e in the output partial area PAb differs according to the arrangement of high-density binary pixels in the binary partial area PAa, at least in the first image direction D1i. Further, the determining unit M124 varies the total number of exposure pixels (the range of exposure positions) in the output partial area PAb for each of two exposure lines (blocks PB1 and PB2) to control the distribution of exposure along the first exposure direction D1e. Further, when the distribution of high-density pixels in the binary partial area PAa in the first image direction D1i is nonuniform, as in patterns P01a-P06a and P11a-P14a in FIG. 11, exposure positions (exposure positions along the second exposure direction D2e) in one of the blocks PB1 and PB2 in the partial exposure pattern include at least one position not included in the exposure positions in the other block.

C. Variations of the Embodiments (1) The output partial area PAb may be configured in any of various sizes and shapes. For example, a single output partial area PAb may be a continuous region overlapping three continuous exposure lines EL in the first exposure direction D1e. The positions of high-density development regions on the three exposure lines EL relative to the first exposure direction D1e can be controlled at a higher resolution than the second resolution by controlling the balance of exposure levels among the three exposure lines EL. In this case, a continuous region overlapping three exposure lines EL may be used as the binary partial area PAa. In general, any region overlapping N (where N is an integer greater than "1") successive exposure lines EL in the first exposure direction D1e may be employed as a single output partial area PAb. (The output partial area PAb overlaps part of the N exposure lines EL with respect to the second exposure direction D2e.) A continuous region that includes a plurality of pixels at different positions in the first image direction D1i may be employed as the binary partial area PAa. Here, the binary partial area PAa is preferably a region that, when the binary partial area PAa is superimposed on the output partial area PAb such that the image represented by the binary image data overlaps the image represented by the exposure pattern, is included in the output partial area PAb and overlaps the N exposure lines EL in the output partial area PAb.

The dimension of the output partial area PAb in the second exposure direction D2e is not limited to two columns worth of binary pixels PXa1, but may be a size corresponding to the range of part of the exposure lines EL in the second exposure direction D2e (for example, a size equivalent to L columns (where L is an integer greater than "0") of binary pixels PXa1). The dimension of the binary partial area PAa in the second image direction D2i is preferably the same as the dimension of the output partial area PAb in the second exposure direction D2e. In either case, both the output partial area PAb and the binary partial area PAa are not limited to a rectangular shape, but may be shaped in various ways.

(2) In addition to the patterns shown in FIGS. 7 and 11, various other partial exposure patterns may be used. For example, when the layout of high-density pixels in the binary partial area PAa is symmetrical in the second exposure direction D2e, the layout of exposure pixels in the output partial area PAb may be symmetrical in the second exposure direction D2e. Thus, for example, in the fifth pattern P05a of FIG. 11, the second through seventh pixels in the first block PB1 may be exposure pixels, and the third through sixth pixels in the second block PB2 may be exposure pixels.

Further, the partial exposure patterns are preferably configured so that the exposure line in the output partial area PAb having the greatest exposure level in the exposure distribution along the first exposure direction D1e corresponds to at least one pixel line in the binary partial area PAa having the largest number of high-density pixels distributed along the first image direction D1i. Here, an exposure line is a line extending in the second exposure direction D2e, while a pixel line is a line of pixels extending in the second image direction D2i. Further, the recitation "an exposure line that corresponds to at least one pixel line" is intended to mean an exposure line that overlaps at least one pixel line when the pattern of binary image data is superimposed on the exposure pattern so that the image represented by binary image data overlaps the image represented by the exposure pattern. Therefore, a single exposure line can correspond to a plurality of pixel lines that are adjacent to one another in the first image direction D1i.

For example, the relative exposure in the first block PB1 of the first pattern P01 of FIG. 7 is "4"; and the relative exposure in the second block PB2 is "3". Accordingly, the exposure line in the exposure distribution having the greatest exposure level is the exposure line in the first block PB1. In the binary partial area PAa, the first line has a total of "1" high-density pixels, while the second line has a total of "0" high-density pixels. Therefore, the pixel line having the largest number of high-density pixels within the distribution of high-density pixels is the first line. The exposure line of the first block PB1 corresponds to the first line in the binary partial area PAa. Hence, suitable exposure can be achieved for the distribution of high-density pixels in the first image direction D1i. Other partial exposure patterns in FIG. 7 and the partial exposure patterns in FIG. 11 are similarly configured. However, some of the partial exposure patterns may be configured not to have the above characteristics.

Generally, it is preferable to determine partial exposure patterns such that the distribution of exposure in the output partial area along the first exposure direction differs according to the layout of high-density pixels in the binary partial area, at least in the first image direction.

(3) In order to modify the distribution of exposure levels along the first exposure direction D1e, a method may be employed for varying the intensity of emitted light at the light source (the laser light source 51a in FIG. 2B, for example) among the plurality of exposure lines in the output partial area PAb.

(4) The resolution of the binary pixel data in the second image direction D2i may differ from its resolution in the first image direction D1i. As an example, the resolution of binary image data used in the first mode with respect to the first image direction D1i may be identical to the resolution in the exposure pattern with respect to the second exposure direction D2e (4800 dpi, for example).

(5) The acquisition unit M122 may acquire binary image data from a device other than the control unit 100. For example, the binary image data generation unit M110 may be built into a device other than the control unit 100, and the acquisition unit M122 may acquire binary image data from the device possessing the binary image data generation unit M110 via a network.

(6) The printing process is not limited to the steps shown in FIG. 3, but may be modified in various ways. For example, the calibration process (S140, S240) may be omitted, and the halftone process (S150, S250) may be configured of the error diffusion method (error accumulation method).

Further, the mode selection unit M140 may automatically select the mode based on the input image data. For example, the mode selection unit M140 may analyze the input image data and identify the type of the input image, such as text, drawing (illustration, graph, etc.), or photo. The mode selection unit M140 selects the first mode when determining that the input image is text or a drawing and selects the second mode when determining that the input image is a photo. In this way, the mode selection unit M140 can automatically select a mode suited to the type of input image without requiring user input. Here, any of various methods well known in the art may be employed for identifying the type of image. For example, the mode selection unit M140 may determine the number of colors used in the input image and may select "text" when the number of colors is fewer than a first threshold, "photo" when the number of colors is greater than a second threshold (larger than the first threshold), and "drawing" when the number of colors is between the first and second thresholds. However, the type of image may be identified using other types of parameters, such as the density of pixels in the input image having a strong edge intensity. Alternatively, the second mode may be omitted, in which case the mode selection unit M140 can be eliminated.

(7) The printing unit 200 of the present invention may be configured in various ways and is not limited to the construction shown in FIG. 2. For example, the exposure unit 51 may include a line light source that exposes the positions of all the exposure process pixels on a single exposure line EL. The printing unit 200 may also include an intermediate transfer member for transferring toner images from the photosensitive drums 54 to the printing medium P. The control unit 100 and printing unit 200 may also be provided independently and housed in different cases.

(8) In the embodiments and variations described above, part of the configuration implemented in hardware may be replaced with software and, conversely, all or part of the configuration implemented in software may be replaced with hardware. For example, the functions of the exposure pattern process unit M120 in FIG. 1 may be implemented with a specialized hardware circuit configured of logic circuits.

When all or part of the functions according to the present invention are implemented in software, the software (i.e., computer programs) can be stored on a computer-readable medium (a non-transitory or non-temporary medium, for example). The "computer-readable medium" may be a portable medium, such as a memory card or CD-ROM; an internal storage device built into the computer, such as any of various ROM, etc.; or an external storage device, such as a hard disk drive, connected to the computer.

In the embodiments, the resolution of the exposure process pixels PXb1 in the second exposure direction D2e is set in the first mode eight times as high as that set in the second mode. However, the resolution of the exposure process pixels PXb1 in the second exposure direction D2e may be set in the first mode to such a value that is different from a value eight times as high as that in the second mode.

While the invention has been described in detail with reference to the embodiments and modifications thereof, it would be apparent to those skilled in the art that various changes and modifications may be made therein without departing from the spirit of the invention.

What is claimed is:

1. A control apparatus for controlling a process for printing an image, the control apparatus comprising:
   a processor; and
   a memory that stores a computer program that, when executed by the processor, causes the control apparatus to function as:
   an acquisition unit configured to acquire first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value; and
   a determining unit configured to execute a first determining process to determine an exposure pattern by using the first type binary image data, the exposure pattern representing exposure positions to be exposed to light on a surface of a photosensitive body,
   the exposure pattern indicating the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines,
   the first determining process determining the exposure pattern such that the exposure pattern is used to execute exposures of the plurality of exposure lines at a second resolution along the first exposure direction, the second resolution being lower than the first resolution,
   in the first determining process, the determining unit determining a partial exposure pattern for exposing an output partial area, the determining unit determining the partial exposure pattern for the output partial area by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area,
   the output partial area overlapping N successive exposure lines that are arranged adjacent to one another in the first exposure direction, where N is an integer greater than or equal to two (2), the output partial area overlapping part of each of the N exposure lines,
   the determining unit determining the partial exposure pattern such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

2. The control apparatus according to claim 1, wherein the determining unit determines the exposure pattern, the distribution of the exposure amount in the exposure pattern being controlled along the first exposure direction in the output partial area by modifying an exposure range indicative of a range of the exposure positions in the output partial area for each of the N exposure lines.

3. The control apparatus according to claim 2, wherein the N exposure lines in the output partial area include a first exposure line and a second exposure line, and
   wherein if the distribution of the second-value pixels in the binary partial area in the first image direction is nonuniform, the determining unit determines the partial exposure pattern such that exposure positions in either one of the first and second exposure lines includes at least one position not included in the exposure positions in the other one of the first and second exposure lines.

4. The control apparatus according to claim 1, wherein the determining unit selects the partial exposure pattern for the output partial area from among a plurality of partial exposure patterns including a first partial exposure pattern, a second partial exposure pattern, and a third partial exposure pattern,
   the first partial exposure pattern being selected if only a first pixel position in the binary partial area is a second-value pixel,
   the second partial exposure pattern being selected if only a second pixel position different from the first pixel position in the binary partial area is a second-value pixel, the third partial exposure pattern being selected if only the first pixel position and the second pixel position in the binary partial area are second-value pixels, an area of exposure positions in the third partial exposure pattern differing at least partially from an area of exposure positions that is obtained by superimposing an area of exposure positions in the first partial exposure pattern and an area of exposure positions in the second partial exposure pattern.

5. The control apparatus according to claim 4, wherein at least a portion of the area of exposure positions obtained by superimposing the area of exposure positions in the first partial exposure pattern and the area of exposure positions in the second partial exposure pattern is excluded from an area of the exposure positions in the third partial exposure pattern.

6. The control apparatus according to claim 1,
wherein the determining unit selects the partial exposure pattern for the output partial area from among a plurality of partial exposure patterns including a first partial exposure pattern, a second partial exposure pattern, and a third partial exposure pattern,
the first partial exposure pattern being selected if only a first pixel position in the binary partial area is a second-value pixel,
the second partial exposure pattern being selected if only a second pixel position different from the first pixel position in the binary partial area is a second-value pixel,
the third partial exposure pattern being selected if only the first pixel position and the second pixel position in the binary partial area are second-value pixels,
an area of exposure positions in the third partial exposure pattern being identical to an area of exposure positions that is obtained by superimposing an area of exposure positions in the first partial exposure pattern and an area of exposure positions in the second partial exposure pattern.

7. The control apparatus according to claim 1, further comprising a mode selection unit configured to select one of a plurality of modes including a first mode and a second mode,
wherein the acquisition unit acquires the first type binary image data if the first mode is selected and acquires a second type binary image data if the second mode is selected, the second type binary image data representing, by using a binary value, density of each of a plurality of pixels that are arranged at the second resolution along the first image direction,
wherein the determining unit executes the first determining process if the first mode is selected, and executes a second determining process if the second mode is selected, the second determining process being for determining, by using the second type binary image data, an exposure pattern representing an image of the color material having the second resolution along the first exposure direction,
the second determining process determining the exposure pattern such that the exposure pattern is used to execute exposures of a plurality of exposure lines to light at the second resolution along the first exposure direction, each exposure line extending in the second exposure direction,
wherein in the second determining process, the determining unit determines exposure positions on one exposure line extending in the second exposure direction, in accordance with one pixel line extending in the second image direction in the second type binary image data.

8. The control apparatus according to claim 1, wherein the partial exposure pattern is configured so that an exposure line in the output partial area having the greatest exposure amount in the exposure amount distribution along the first exposure direction corresponds to at least one pixel line in the binary partial area having the largest number of second-value pixels in a distribution of the number of second-value pixels along the first image direction.

9. The control apparatus according to claim 1, wherein the determining unit divides all the pixels in the first type binary image data into a plurality of binary partial areas that do not overlap one another, determines the partial exposure pattern for one output partial area correlated with each binary partial area, and determines the exposure pattern for the first type binary image data based on the partial exposure patterns determined for the output partial areas correlated with all the binary partial areas in the first type binary image data.

10. The control apparatus according to claim 9, wherein the determining unit determines the exposure pattern for the first type binary image data by superimposing the partial exposure patterns determined for the output partial areas correlated with all the binary partial areas in the first type binary image data.

11. A method for controlling a process for printing an image, the method comprising:
acquiring first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value; and
executing a first determining process to determine an exposure pattern by using the first type binary image data, the exposure pattern representing exposure positions to be exposed to light on a surface of a photosensitive body,
the exposure pattern indicating the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines,
the first determining process determining the exposure pattern such that the exposure pattern is used to execute exposures of the plurality of exposure lines at a second resolution along the first exposure direction, the second resolution being lower than the first resolution,
in the first determining process, a partial exposure pattern for exposing an output partial area being determined by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area,
the output partial area overlapping N successive exposure lines that are arranged adjacent to one another in the first exposure direction, where N is an integer greater than or equal to two (2), the output partial area overlapping part of each of the N exposure lines,
the partial exposure pattern being determined such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

12. A non-transitory computer-readable medium storing a set of program instructions that, when executed by a computer, causes the computer to perform operations comprising:

acquiring first type binary image data, the first type binary image data representing density of each of a plurality of pixels by using a binary value, the plurality of pixels being arranged in a matrix along a first image direction and a second image direction that intersect each other, the pixels being arranged at a first resolution in the first image direction, the binary value being either one of a first value and a second value, the second value indicating a higher density than the first value; and executing a first determining process to determine an exposure pattern by using the first type binary image data, the exposure pattern representing exposure positions to be exposed to light on a surface of a photosensitive body, the exposure pattern indicating the exposure positions on a plurality of exposure lines, the exposure lines being different in their positions along a first exposure direction corresponding to the first image direction, each exposure line extending in a second exposure direction corresponding to the second image direction, the exposure pattern enabling exposures to be executed on each of the plurality of exposure lines, the first determining process determining the exposure pattern such that the exposure pattern is used to execute exposures of the plurality of exposure lines at a second resolution along the first exposure direction, the second resolution being lower than the first resolution, the executing the first determining process including determining a partial exposure pattern for exposing an output partial area, the partial exposure pattern for exposing the output partial area being determined by using a layout of second-value pixels within a binary partial area, the second-value pixels having the second values, the binary partial area being a continuous partial area in the first type binary image data and including a plurality of pixels at different positions in the first image direction, the output partial area being a continuous partial area correlated with the binary partial area, the output partial area overlapping N successive exposure lines that are arranged adjacent to one another in the first exposure direction, where N is an integer greater than or equal to two (2), the output partial area overlapping part of each of the N exposure lines, the partial exposure pattern being determined such that distribution of exposure amounts in the output partial area along the first exposure direction differs according to the layout of the second-value pixels in the binary partial area at least in the first image direction, thereby enabling an image of color material to be formed through development on the photosensitive body at a resolution higher than the second resolution in the first exposure direction.

* * * * *